(12) United States Patent
Sato et al.

(10) Patent No.: US 7,734,103 B2
(45) Date of Patent: Jun. 8, 2010

(54) IMAGE PROCESSING APPARATUS AND IMAGE PROCESSING METHOD

(75) Inventors: Nobuyuki Sato, Kanagawa (JP); Shiro Kofuji, Kanagawa (JP); Naoyuki Urata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 980 days.

(21) Appl. No.: 11/498,030

(22) Filed: Aug. 2, 2006

(65) Prior Publication Data
US 2007/0031047 A1 Feb. 8, 2007

(30) Foreign Application Priority Data
Aug. 4, 2005 (JP) .............................. 2005-227106

(51) Int. Cl.
G06K 9/36 (2006.01)
G06K 9/46 (2006.01)
(52) U.S. Cl. .................. 382/232; 382/233; 382/296
(58) Field of Classification Search .............. 382/162, 382/166, 232, 233, 296
See application file for complete search history.

(56) References Cited

U.S. PATENT DOCUMENTS

| 6,470,052 | B1 | 10/2002 | Nguyen et al. |
| 6,519,052 | B1 * | 2/2003 | Oneda et al. ............. 358/1.16 |
| 7,212,677 | B2 * | 5/2007 | Mishima .................. 382/237 |

FOREIGN PATENT DOCUMENTS

| CN | 1538248 | 10/2004 |
| JP | 6-7668 | 1/1994 |
| JP | 6-7688 | 1/1994 |
| JP | 08-224916 | 9/1996 |
| JP | 08-317225 | 11/1996 |
| JP | 11-227263 | 8/1999 |
| JP | 2001-218061 | 8/2001 |
| JP | 2002-209110 A | 7/2002 |
| JP | 2004-104621 A | 4/2004 |
| JP | 2004-266654 A | 9/2004 |
| JP | 2004-358711 A | 12/2004 |

\* cited by examiner

Primary Examiner—Phuoc Tran
(74) Attorney, Agent, or Firm—Ladas & Parry LLP

(57) ABSTRACT

An image processing apparatus for compressing and decompressing image data is disclosed that is capable of image processing with a small memory area. The image processing apparatus includes a compression unit to compress the image data to a predetermined compression format; an omission secondary compression unit to omit a portion of the compressed image data given by the compression unit, divide the compressed image data into blocks having predetermined block sizes, and perform secondary compression to generate omission secondary compression image data; a data recovery unit to recover the omission secondary compression image data into the compressed image data; an image rotation unit to rotate the compressed image data decompressed by the data decompression unit according to the block sizes; a block storage unit to store the rotated compressed image data in units of the block sizes; and a data decompression unit to decompress the compressed image data stored in the block storage unit according to predetermined conditions.

18 Claims, 17 Drawing Sheets

FIG.9

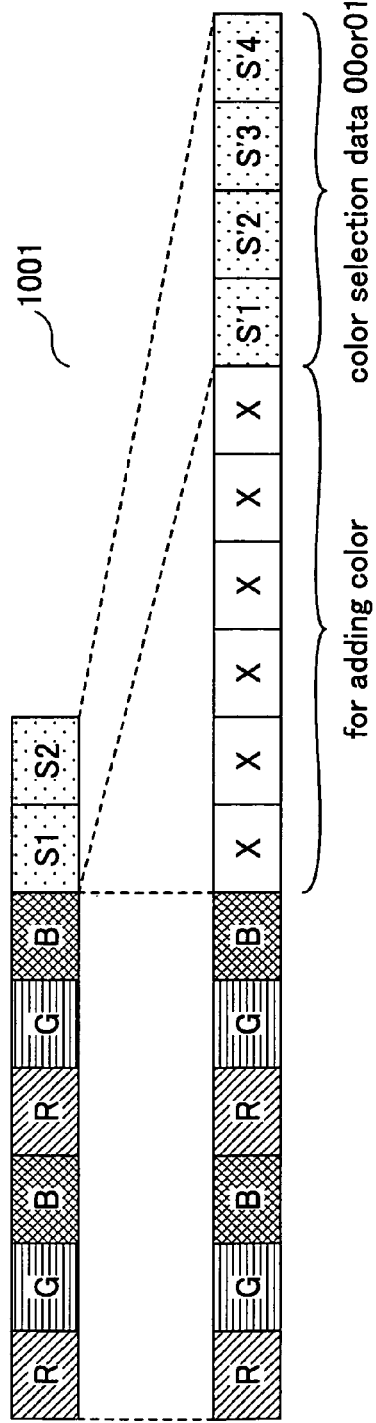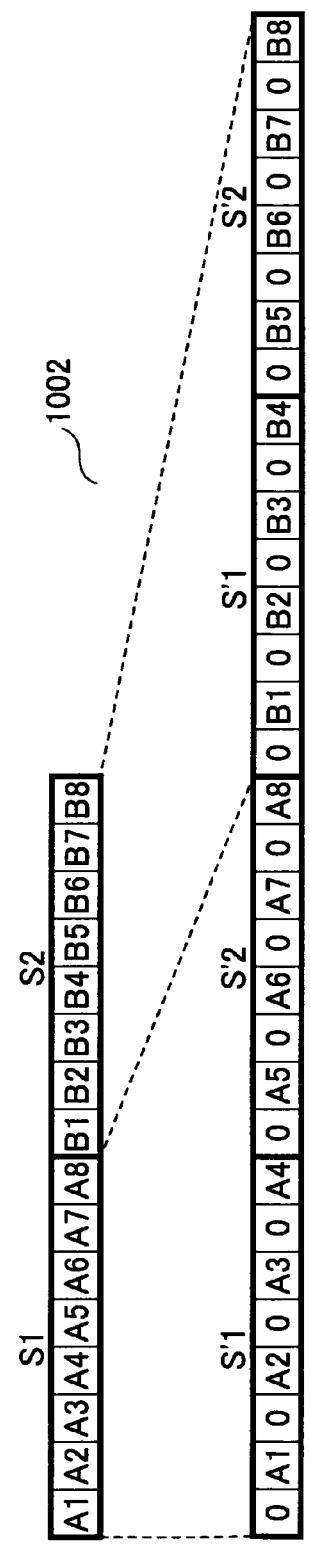
FIG.10A
FIG.10B

IMAGE PROCESSING APPARATUS AND IMAGE PROCESSING METHOD

BACKGROUND OF THE INVENTION

1. Field of the Invention

The present invention relates to an image processing apparatus and an image processing method, and particularly, to an image processing apparatus and an image processing method capable of image processing with a small memory area.

2. Description of the Related Art

In the related art, there exist image processing apparatuses which appropriately process image data transmitted from upper level devices such as a computer or a scanner, and output the image data to an image output device. For example, Japanese Laid-Open Patent Application No. 11-227263 (below, referred to as "reference 1") discloses a technique in this field.

Below, descriptions are made of an image processing apparatus in the related art.

FIG. 1 is a block diagram exemplifying a configuration of an image processing apparatus in the related art.

As an example, in FIG. 1, a printer system is used as the image processing apparatus in the related art. In addition, in the following descriptions, bitmap image data are used as an example of the image data subject to image processing.

As shown in FIG. 1, an image processing apparatus 100 includes a computer 101 functioning as an upper-level device, a printer controller 102 serving as a control unit, and a printer engine 103 serving as an image output unit.

The computer 101 includes an image data input unit 111, a data compression unit 112, and a transmission memory 113.

The image data input unit 111 receives the bitmap image data from image data stored in a memory (not illustrated) of the computer 101, or image data stored in other devices connected through wireless or cable communication networks such as telephone lines or LAN (Local Area Network) cables. In addition, the image data input unit 111 outputs the received bitmap image data to the data compression unit 112.

The data compression unit 112 compresses the received image data to form image data of a format supported by a printer driver, and outputs the compressed image data to the transmission memory 113.

The transmission memory 113 stores the compressed image data and outputs a preset amount of the compressed image data to the printer controller 102 at preset timings.

The printer controller 102 includes a reception memory 121, a data decompression unit 122, a frame memory 123, an image processing unit 124, and a line memory 125. The printer controller 102 receives the compressed image data from the computer 101, and stores the compressed image data in the reception memory 121.

The data decompression unit 122 decompresses the image data received from the reception memory 121 and generates the bitmap image data, and outputs the decompressed bitmap image data to the frame memory 123.

The frame memory 123 stores an amount of the bitmap image data equivalent to one frame (one picture), and outputs the stored bitmap image data to the image processing unit 124.

The image processing unit 124 performs color correction, color transformation, dither processing, edge processing, and other image processing on the bitmap image data, and outputs the processed image data to the line memory 125.

The line memory 125 outputs the image data to the printer engine 103, for example, by means of FIFO (First-In First-Out).

The printer engine 103 generates and outputs printing images from the image data received from the printer controller 102.

It should be noted that processes in the printer system 100 as shown in FIG. 1 are for generating monochromatic images. When generating color images, for example, with a color printer, it is necessary to generate CMYK images, that is, Cyan (C), Magenta (M), Yellow (Y), Black (K) images. For this purpose, usually, it is required to repeat the above-described processes four times. In this case, the speed of generating a color image is reduced to one-fourth of that for forming a monochromatic color.

In order to realize a high-speed color printer having high speed for printing color images, a tandem-type printer engine was proposed. The tandem-type printer engine has four image generation units and can generate CMYK four color images at the same time. With the tandem-type printer engine, the speed of generating a color image is the same as that of generating a monochromatic color.

Below, a printer controller adapted to support the tandem-type printer engine is described.

FIG. 2 is a block diagram exemplifying a configuration of a printer controller for a tandem-type operation.

As shown in FIG. 2, a printer controller 202 includes a reception memory 221, a data decompression unit 222, a frame memory 223, image processing units 224-1 to 224-4, and line memories 225-1 to 225-4.

The printer controller 202 receives the compressed image data from the computer 101, and stores the compressed image data in the reception memory 221.

The data decompression unit 222 decompresses the image data received from the reception memory 221 and generates the bitmap image data, and outputs the decompressed bitmap image data to the frame memory 223.

The image processing units 224-1 to 224-4 carry out color correction, color transformation, dither processing, edge processing, and other image processing on the bitmap image data for the four colors, respectively, output the processed image data to the printer engine 103 through the corresponding line memories 225-1 to 225-4. Usually, the line memories 225-1 to 225-4 for different colors have different capacities.

FIG. 3 is a block diagram illustrating a configuration of a tandem-type printer engine.

As shown in FIG. 3, a tandem-type printer engine 301 includes exposure units 311-1 through 311-4, photosensitive drums 312-1 through 312-4, developing units 313-1 through 313-4, and an intermediate transfer 314. In the tandem-type printer engine 301, the exposure units 311-1 through 311-4 expose corresponding printing colors, for example, CMYK, on the photosensitive drums 312-1 through 312-4 to form electrostatic latent images thereon; the developing units 313-1 through 313-4 develop the respective latent images to form monochromatic images of the CMYK printing colors on the photosensitive drums 312-1 through 312-4, respectively; these monochromatic images are superposed on the intermediate transfer 314 and are transferred to a recoding medium 315 to form a color image thereon.

However, as shown in FIG. 3, in a tandem-type printer, the timings of operating the exposure units 311-1 through 311-4 change depending on intervals between the CMYK photosensitive drums 312-1 through 312-4. Due to this, the color handled at a later timing produces a larger amount of data, and requires a line memory of a larger capacity. Therefore, in order to maintain the high printing speed when using the tandem type printer, the hardware resources and the memory capacity need be increased fourfold, and thus, the cost of the whole image processing apparatus increases.

SUMMARY OF THE INVENTION

The present invention may solve one or more problems of the related art.

A preferred embodiment of the present invention may provide an image processing apparatus and an image processing method capable of image processing with a small memory area.

According to a first aspect of the present invention, there is provided an image processing apparatus for compressing and decompressing an image data, comprising:

a compression unit configured to compress the image data to a predetermined compression format;

an omission secondary compression unit configured to omit a portion of the compressed image data given by the compression unit, divide the compressed image data into blocks having predetermined block sizes, and perform secondary compression to generate omission secondary compression image data;

a data recovery unit configured to recover the omission secondary compression image data into the compressed image data;

an image rotation unit configured to rotate the compressed image data decompressed by the data decompression unit according to the block sizes;

a block storage unit configured to store the rotated compressed image data in units of the block sizes; and a data decompression unit configured to decompress the compressed image data stored in the block storage unit according to predetermined conditions.

According to a second aspect of the present invention, there is provided an image processing apparatus, comprising:

an upper level device that includes
  a compression unit configured to compress image data to a predetermined compression format, and
  an omission secondary compression unit configured to omit a portion of the compressed image data given by the compression unit, divide the compressed image data into blocks having predetermined block sizes, and perform secondary compression to generate omission secondary compression image data; and
a control device that includes
  a data recovery unit configured to recover the omission secondary compression image data into the compressed image data,
  an image rotation unit configured to rotate the compressed image data decompressed by the data decompression unit according to the block sizes,
  a block storage unit configured to store the rotated compressed image data in units of the block sizes, and
  a data decompression unit configured to decompress the compressed image data stored in the block storage unit according to predetermined conditions.

As an embodiment, the omission secondary compression unit compares two successive compressed image data groups given by the compression unit, and omits the portion of the compressed image data groups according to comparison results.

As an embodiment, the omission secondary compression unit generates page information including address information of the omission secondary compression image data based on a predetermined rotational direction of the image rotation unit and an order of data decompression in the data decompression unit.

As an embodiment, the data recovery unit inserts predetermined values into color information and color selection information in the compressed image data omitted by the omission secondary compression unit.

As an embodiment, the image processing apparatus includes plural data decompression units or plural image rotation units when the image data includes plural colors.

According to a third aspect of the preset invention, there is provided an image processing method for compressing and decompressing an image data, comprising the steps of:

compressing the image data to a predetermined compression format;

omitting a portion of the compressed image data obtained in the step of compressing, dividing the compressed image data into blocks having predetermined block sizes, and performing secondary compression to generate omission secondary compression image data;

recovering the omission secondary compression image data into the compressed image data;

rotating the compressed image data produced in the step of recovering according to the block sizes;

storing the rotated compressed image data in units of the block sizes; and decompressing the compressed image data stored in the step of storing according to predetermined conditions.

As an embodiment, the step of omitting includes a step of comparing two successive compressed image data groups obtained in the step of compressing, and omitting the portion of the compressed image data groups according to comparison results.

As an embodiment, the step of omitting includes a step of generating page information including address information of the omission secondary compression image data based on a predetermined rotational direction in the step of rotating and an order of data decompression in the step of decompressing.

As an embodiment, the step of recovering includes a step of inserting predetermined values into color information and color selection information in the compressed image data omitted by the omission secondary compression unit.

According to a fourth aspect of the present invention, there is provided a storage medium wherein an image processing program is stored, said image processing program being executable in a computer to drive the computer to execute the steps of:

compressing the image data to a predetermined compression format;

omitting a portion of the compressed image data obtained in the step of compressing, dividing the compressed image data into blocks having predetermined block sizes, and performing secondary compression to generate omission secondary compression image data;

recovering the omission secondary compression image data into the compressed image data;

rotating the compressed image data produced in the step of recovering according to the block sizes;

storing the rotated compressed image data in units of the block sizes; and decompressing the compressed image data stored in the step of storing according to predetermined conditions.

According to the present invention, it is possible to perform image processing with a small memory area, and this reduces the capacity of the memory of an image processing apparatus.

These and other objects, features, and advantages of the present invention will become more apparent from the fol-

BRIEF DESCRIPTION OF THE DRAWINGS

FIG. 9 is a diagram illustrating an example of original image data;

FIG. 10A and FIG. 10B are diagrams illustrating an example of recovered BTC data, where FIG. 10A shows an example of the BTC format, and FIG. 10B shows an example of color selection format;

DESCRIPTION OF THE PREFERRED EMBODIMENTS

Below, preferred embodiments of the present invention are explained with reference to the accompanying drawings.

First, a general description of the present invention is made.

In an image processing apparatus of the present invention, in order to reduce the amount of data, compressed image data are generated with a portion thereof being omitted. In addition, the image processing apparatus of the present invention includes an image rotation unit for rotating the compressed image data without decompression, and a data decompression unit for decompressing the compressed image data after the rotation.

That is, in order to obtain an image processing apparatus with low cost, it is important to reduce the amount of data. Further, in addition to performing general data compression, it is also important to omit a portion of recoverable data, and edit compressed images (enlarge, reduce, paste, rotate, and others), while considering characteristics of the image data.

In embodiments of the present invention, a BTC (Block Truncation Coding) compression technique is used for compression, and additionally, various methods of data reduction and data edition are added while considering features of the BTC compression technique. Here, the BTC compression is a method of compression which utilizes the fact that adjacent dots have similar tints in image data sets, and BTC compression data include plural pieces of color information and color selection information indicating the typical color of each dot.

Figure 4:
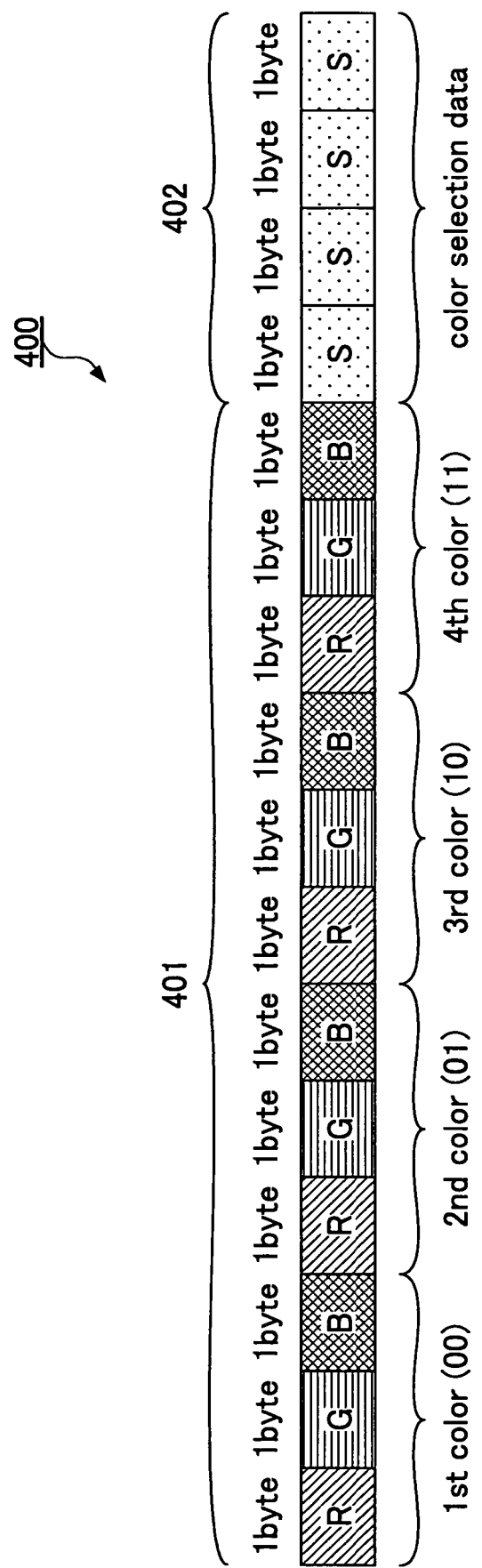
FIG. 4 is a diagram illustrating an example of a BTC data format.

FIG. 4 is a diagram illustrating an example of a BTC data format.

In FIG. 4, as an example, in a BTC data format 400, 4×4 dots at a resolution of 300 dpi are expressed by four colors. In the BTC data format 400, the forward 12 bytes correspond to color information 401 indicating values (8 bits for each color) of R (Red), G (Green), B (Blue) components of each of four typical colors. The back portion of the BTC data format 400 corresponds to color selection information 402 indicating the typical color of each of all 4×4 (=16) dots. For example, a two-bit data element is assigned to each color. Specifically, a value "00" is assigned to the first color, a value "01" is assigned to the second color, a value "10" is assigned to the third color, and a value "11" is assigned to the fourth color.

Below, a method of determining the typical four colors is described.

Figure 5A:
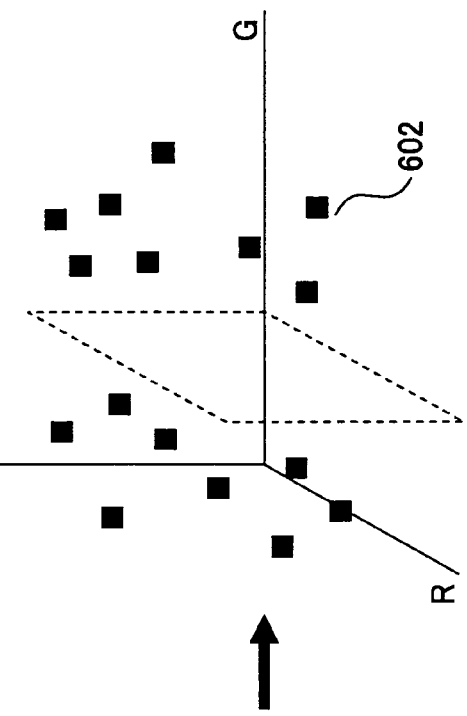
FIG. 5A through FIG. 5C are diagrams exemplifying a method of determining the typical four colors of the 4×4 (=16) dots.
Figure 5B:
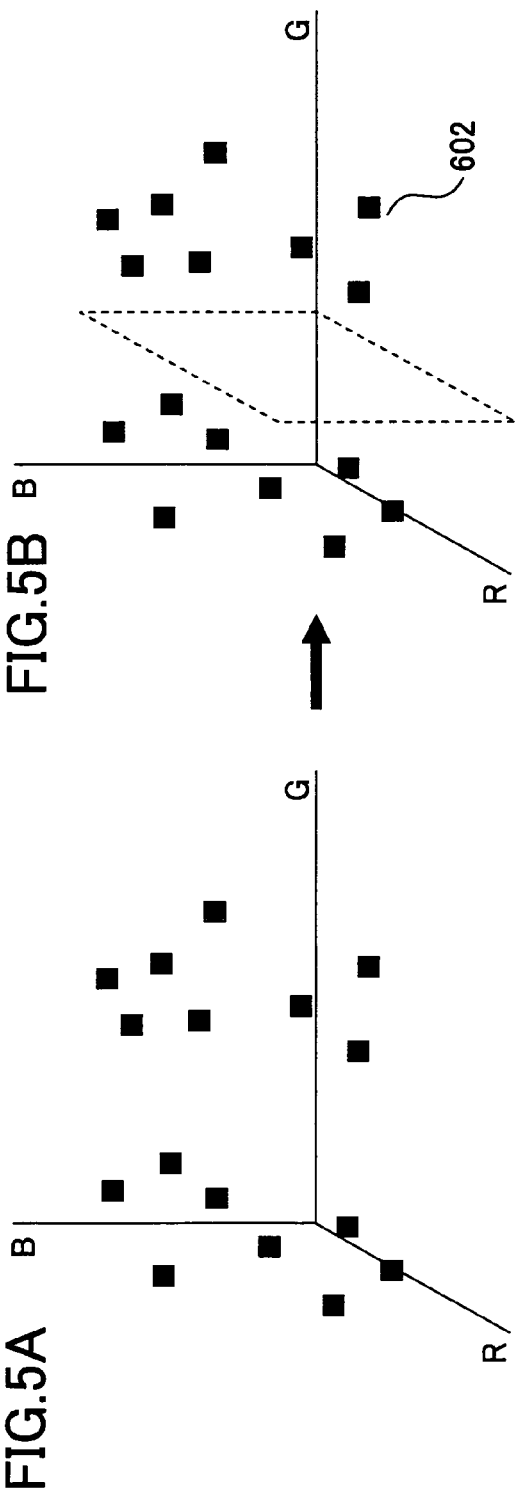
Figure 5C:
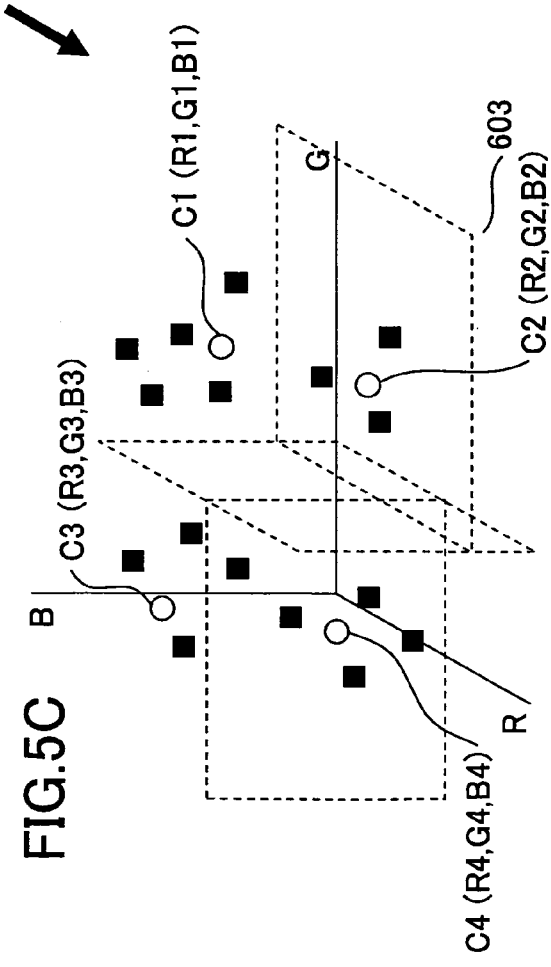

FIG. 5A through FIG. 5C are diagrams exemplifying a method of determining the typical four colors of the 4×4 (=16) dots.

As shown in FIG. 5A, grade values of the 4×4 (=16) dots at 300 dpi are plotted in a RGB space.

Next, as shown in FIG. 5B, the maximum grade values and minimum grade values of RGB of the 4×4 (=16) dots at 300 dpi are detected, and an average grade value of two grade values having the largest grade difference is used to divide the color space into two sub color spaces.

Next, as shown in FIG. 5C, in each of the two sub color spaces, similarly, an average grade value of two grade values having the largest grade difference is used to divide each of the sub color spaces into two sub color spaces. Hence, the primary color space is divided into four sub color spaces. Then, the average RGB values of dots belonging to each of the four sub color spaces are calculated, and these average RGB values are used as typical color values of the four sub color spaces, represented by C1 (R1, G1, B1), C2 (R2, G2, B2), C3 (R3, G3, B3), and C4 (R4, G4, B4), respectively.

In BTC compression, when performing color conversion, for example, from RGB to CMY, or image processing, for example, color correction, data processing may be performed only on the forward portion in the above-mentioned data format in FIG. 4, that is, only on the color information 401. When performing image editing, such as enlargement, reduction, and rotation of images, the back portion in the above-mentioned data format in FIG. 4, that is, the color selection information 402, may be rearranged to realize the image editing. In other words, due to BTC compression, the amount of data and the memory size can be reduced; further, image processing and image editing can be performed at the same time, thus, the speed of data processing can be increased.

In addition, in the BTC compression described above, as an example, a method involving four-color approximation is explained, but the color space may be divided only once, that is, to make two-color approximation. In the latter case, the image quality might be degraded slightly, but the amount of data is reduced to be only half; hence it is expected that this method may be effective.

For example, the compression and decompression methods described in the above-mentioned Japanese Laid-Open Patent Application No. 11-227263 or in the Japanese Laid-Open Patent Application No. 60-87596 (below, referred to as "reference 2") may be used in the BTC compression technique. In reference 1, the typical colors in the BTC compression are fixed to, for example, four colors. However, in common business documents created by spreadsheet software or word-processing software, usually, the number of colors in used is less than that in natural images, in other words, in the above-described compression technique, although four typical colors are used as an approximation, actually, only one or two colors are sufficient in many cases. Further, in many cases, the colors used before or after a block (in the above example of compression, the 4×4 block) are the same.

Thus, in the present invention, even for image data in the same page, the data are created such that a natural image in the page is expressed by BTC data of four typical colors, and another portion in the page is expressed by BTC data of two or one typical colors. In addition, data in the present block are compared to data in the prior block, and data having the same values (color information, color selection information, and others) are omitted, thereby, the amount of data is reduced.

Further, with respect to the compressed image data, which are subject to data compression and data omission, common compression techniques, such as JBIG (Joint Bi-level Image experts Group), or MH (Modified Huffman), are used to perform secondary compression. This can effectively reduce the amount of data. In this case, a printer controller receives the secondary compression image data and stores the received secondary compression image data in a reception memory temporarily, sequentially decompresses the secondary compression image data, and writes the BTC compression data in a frame memory.

Here, when it is necessary to rotate a page, usually, the BTC compression data corresponding to one side of a page are expanded in a frame memory, and by changing the reading position, the page can be rotated. However, in this method, since at least an area of the frame memory corresponding to one side of a page has to be used, and this is not effective.

Upon that, in the present invention, large blocks are formed each including plural (m×n) BTC blocks, each of which BTC blocks has a predetermined block size. By carrying out data compression and data omission in units of the large blocks, rotation of the compressed data itself can be realized without decompression.

Below, the large block method is described.

Figure 6:
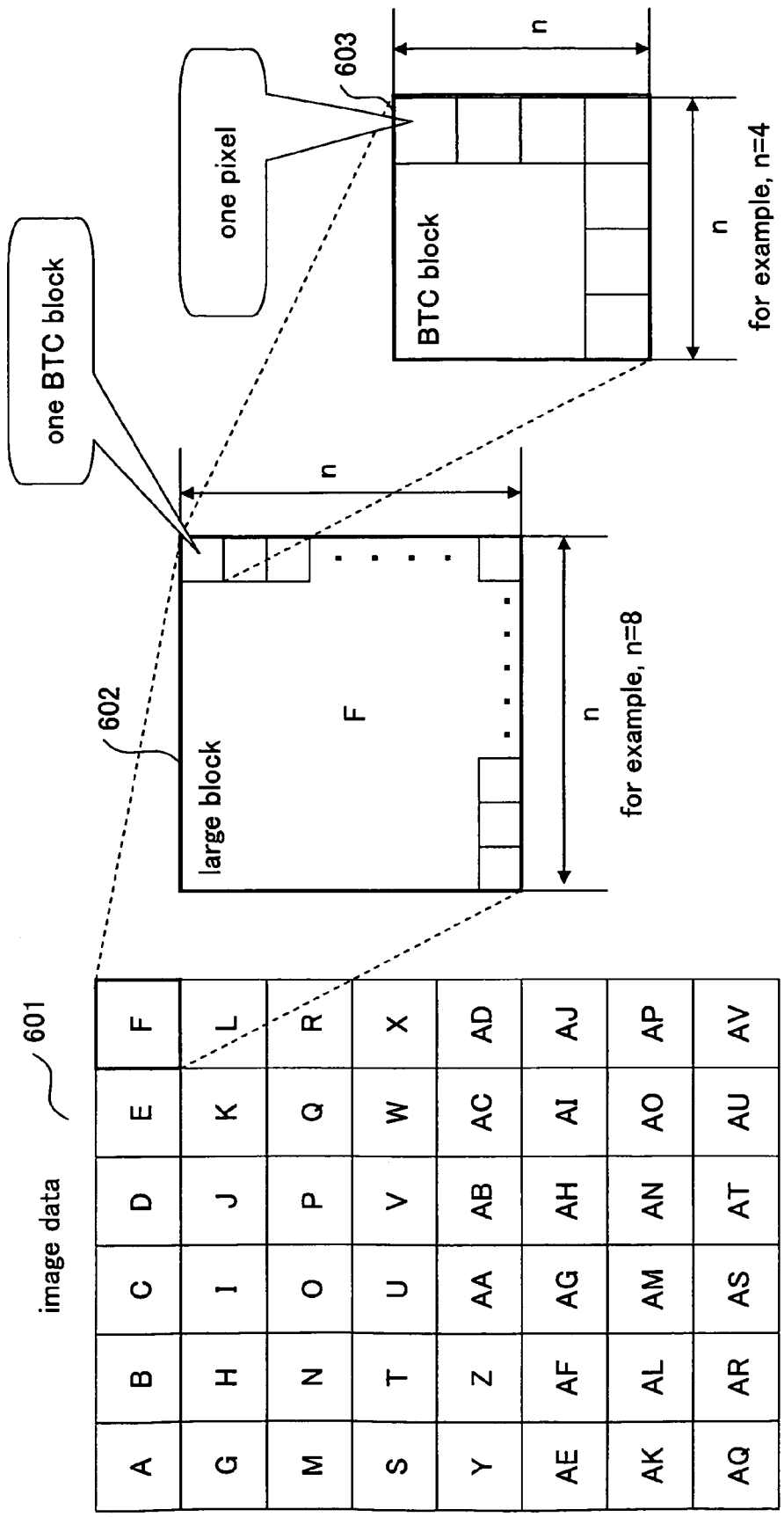
FIG. 6 is a diagram illustrating an example of the large block method.

FIG. 6 is a diagram illustrating an example of the large block method.

As shown in FIG. 6, image data 601 include plural large blocks (A through AV). For example, in one large block 602, plural BTC blocks are arranged in a matrix manner. It should be noted that although it is shown that each large block includes 8×8 BTC blocks, the present invention is not limited to this. However, when the size of the large block is smaller, the burst efficiency of memory access lowers, and when the size of the large block is larger, the required capacity of the frame memory after expansion increases. Therefore, it is preferable that one large block include 4×4 through 32×32 BTC blocks.

In addition, each of the above mentioned BTC blocks includes plural dots. It should be noted that although it is illustrated that one BTC block includes 4×4 dots in FIG. 6, the present invention is not limited to this.

In embodiments of the present invention, common compression techniques, such as JBIG or MH are used to perform common compression (secondary compression) on the BTC data in units of large blocks. When the printer controller receives BTC secondary compression image data in units of large blocks, since the data are stored in the reception memory in order of the large blocks, by changing the order of decompressing the secondary compression image data, it is possible to realize rotation of images (pages) without decompressing all of the secondary compression image data.

In this process, since it is necessary for the printer controller to know where the secondary compression image data in units of large blocks are stored in the memory, it is necessary to receive page lists indicating addresses of the large blocks from printer drivers. Due to this, the amount of data transmitted from a computer to the printer increases more or less, but this increase is small compared to the total reduction of the data.

Next, preferred embodiments of the present invention are explained.

Figure 7:
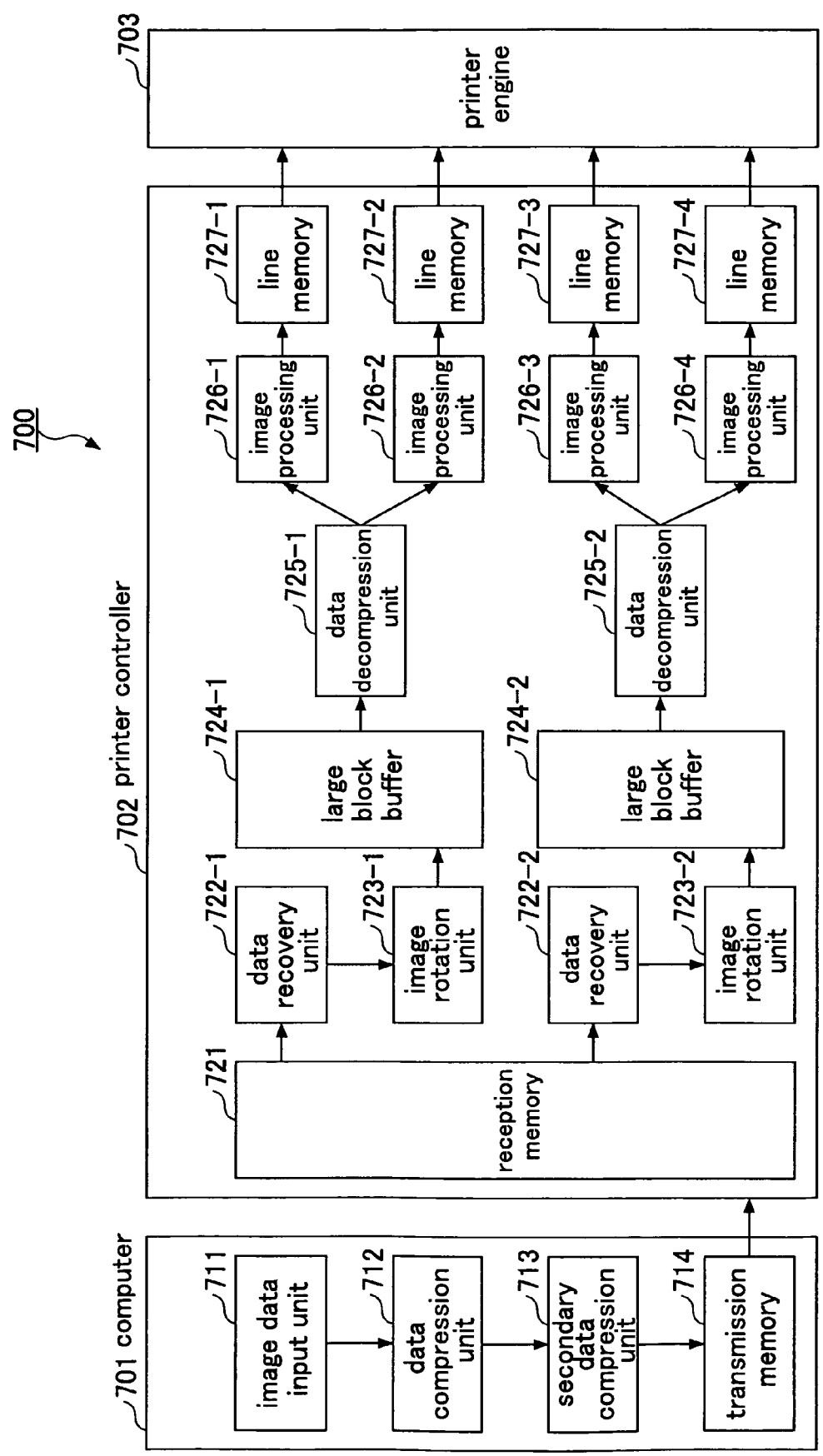
FIG. 7 is a block diagram exemplifying a configuration of an image processing apparatus according to an embodiment of the present invention.

FIG. 7 is a block diagram exemplifying a configuration of an image processing apparatus according to an embodiment of the present invention.

It should be noted that a color printer is taken as an example of the image processing apparatus of the present embodiment as shown in FIG. 7, but the image processing apparatus of the present embodiment is not limited to this.

As shown in FIG. 7, an image processing apparatus 700 includes a computer 701 functioning as an upper-level device, a printer controller 702 serving as a control unit, and a printer engine 703 serving as an image output unit.

Here, it is assumed that the image processing apparatus 700 has functions of the computer 701 and the printer controller 702. The computer 701 and the printer controller 702 may be separate devices, or they may be integrated with each other. In the following descriptions, bitmap image data are used as an example of the image data subject to image processing, but the present embodiment is not limited to this.

<Computer 701>

The computer 701 includes an image data input unit 711, a data compression unit 712, an omission secondary compression unit 713, and a transmission memory 114.

The image data input unit 711 receives the bitmap image data from image data stored in a memory (not illustrated) of the computer 701, or image data stored in other devices connected through wireless or cable communication networks. In addition, the image data input unit 711 outputs the received bitmap image data to the data compression unit 712.

The data compression unit 712 compresses the received image data into a compression format available in a printer driver. For example, in the present embodiment, the above-mentioned BTC compression method is used. Next, the data compression unit 712 outputs the BTC compression image data to the omission secondary compression unit 713.

The omission secondary compression unit 713 performs compression (the so-called "secondary compression") on the BTC compression image data in units of large blocks by means of compression techniques, such as JBIG (Joint Bi-level Image experts Group), or MH (Modified Huffman). Here, for example, one large block includes 8×8 BTC blocks.

During the secondary compression, the omission secondary compression unit 713 confirms the typical colors used in the BTC blocks in the large blocks, and when only two colors are used in all the BTC blocks, the omission secondary compression unit 713 deletes the other two unused colors. Due to this, it is sufficient that the color selection information have one bit for one dot, so that the amount of data is reduced by half compared to the case in which four typical colors exist.

In addition, when there is only one typical color used in all BTC blocks in the large blocks, for example, a blank space, a black and white drawing, since the color selection information is not necessary in this case, and it is sufficient to just output color information of one color, the amount of data can be reduced more. Then, the final number of pieces of the color information is added to the header of the corresponding large block.

Next, in order to further reduce the data, the omission secondary compression unit 713 compares the BTC data group processed immediately previously to the newly input BTC data group. Specifically, the omission secondary compression unit 713 compares RGB color information and color selection information in units of bytes, then, if the values of the bytes in the respective BTC data groups are different, a value "1" is assigned to the bytes, and if the values of the bytes in the respective BTC data groups are the same, a value "0" is assigned to the bytes. Then, a header is created, which is called a "difference header" and includes the same number of bits as the number of the bytes in the BTC data group. Then, omission data of the two BTC data groups are created respectively, each of which includes the difference header and data bytes following the difference header. The data bytes in the omission data of one BTC data group only include bytes having different values from the same byte in the other BTC data group, and the other bytes in the one BTC data group are deleted.

Below, the above-described process is explained.

Figure 8:
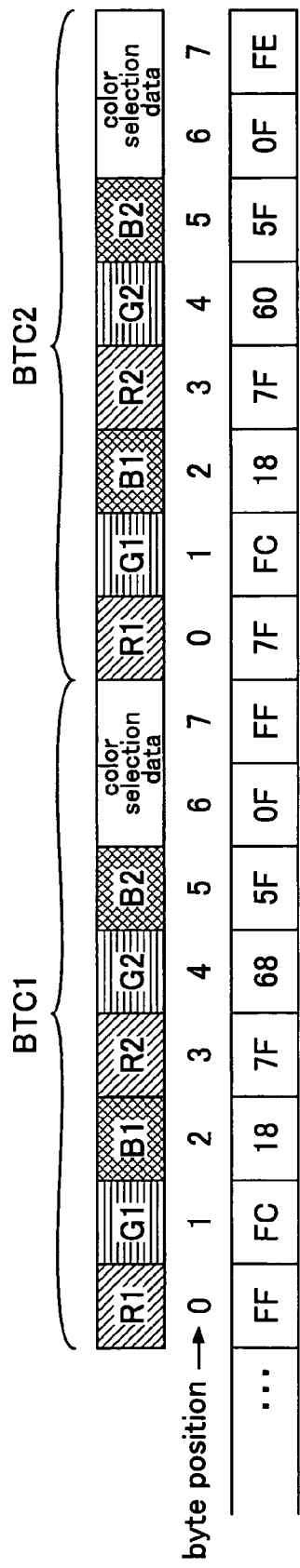
FIG. 8 is a diagram exemplifying a data structure of the difference header.
Figure 8:
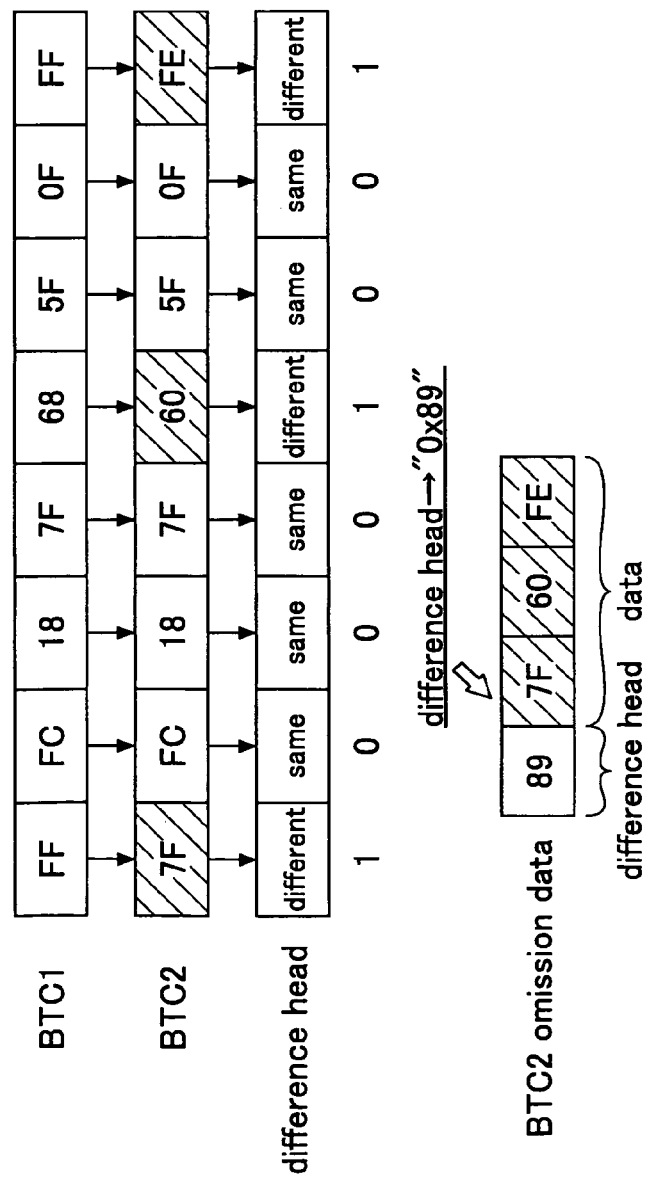

FIG. 8 is a diagram exemplifying a data structure of the difference header.

In FIG. 8, it is assumed that the difference header includes two successive BTC data groups (BTC1, BTC2) each having 8 bytes.

As shown in FIG. 8, bytes of the BTC data groups BTC1, BTC2 at the same byte positions (0 to 7) are compared sequentially in units of bytes, and according to the comparison results, the above-mentioned "1", "0" bit string is generated. Then, after all the bytes of the BTC data groups BTC1, BTC2 are compared, as shown in FIG. 8, a bit string including eight bits (one byte) "10001001" is obtained, which is the difference header. The value of the difference header can be expressed as (89) in hexadecimal (0×). In addition, BTC2 omission data are created which include the difference header byte and data bytes following the difference header byte, and data bytes in the BTC2 omission data group only include bytes having different values from the same byte in the BTC1 group, and other bytes in the BTC2 group are deleted. In this way, it is possible to realize data omission. This data omission method is especially effective in image processing of common business documents having few colors.

The omission secondary compression unit 713 sends the omission secondary compression image data to the transmission memory 714.

The transmission memory 714 stores the omission secondary compression image data and then outputs the omission secondary compression image data to the printer controller 702 through a data transmission unit (not illustrated).

In the above, the secondary compression is carried out in units of preset block sizes (large block), additionally, since the secondary compression involves variable-length compression, the printer controller 702, which receives the compressed data, cannot determine the starting addresses of the large blocks.

For this reason, when the omission secondary compression unit 713 stores the omission secondary compression image data in the transmission memory 714, the omission secondary compression unit 713 generates page information (page list) including address information of the omission secondary compression image data based on a preset rotational direction of image rotation units 723 and the order of data decompression in data decompression units 725, and stores the page information in the transmission memory 714. That is, the page list including addresses of the secondary compression image data is generated in order of decompression of the large block while taking into consideration the rotational direction of the data. The omission secondary compression image data and the page list are transmitted to the printer controller 702. In this way, the printer controller 702 can easily determine the starting addresses of the large blocks.

It should be noted that the page list may also include information related to the page in addition to the address information, for example, information indicating the compression method used in the secondary compression image data capacity, day and time of processing, and contents of the image data.

<Printer Controller 702>

Below, the printer controller 702 is explained. In the following, when explaining image rotation in units of large blocks, as an example, original image data as shown in FIG. 9 are used for explanation of image rotation by 90 degrees in the clockwise direction.

Figure 9:
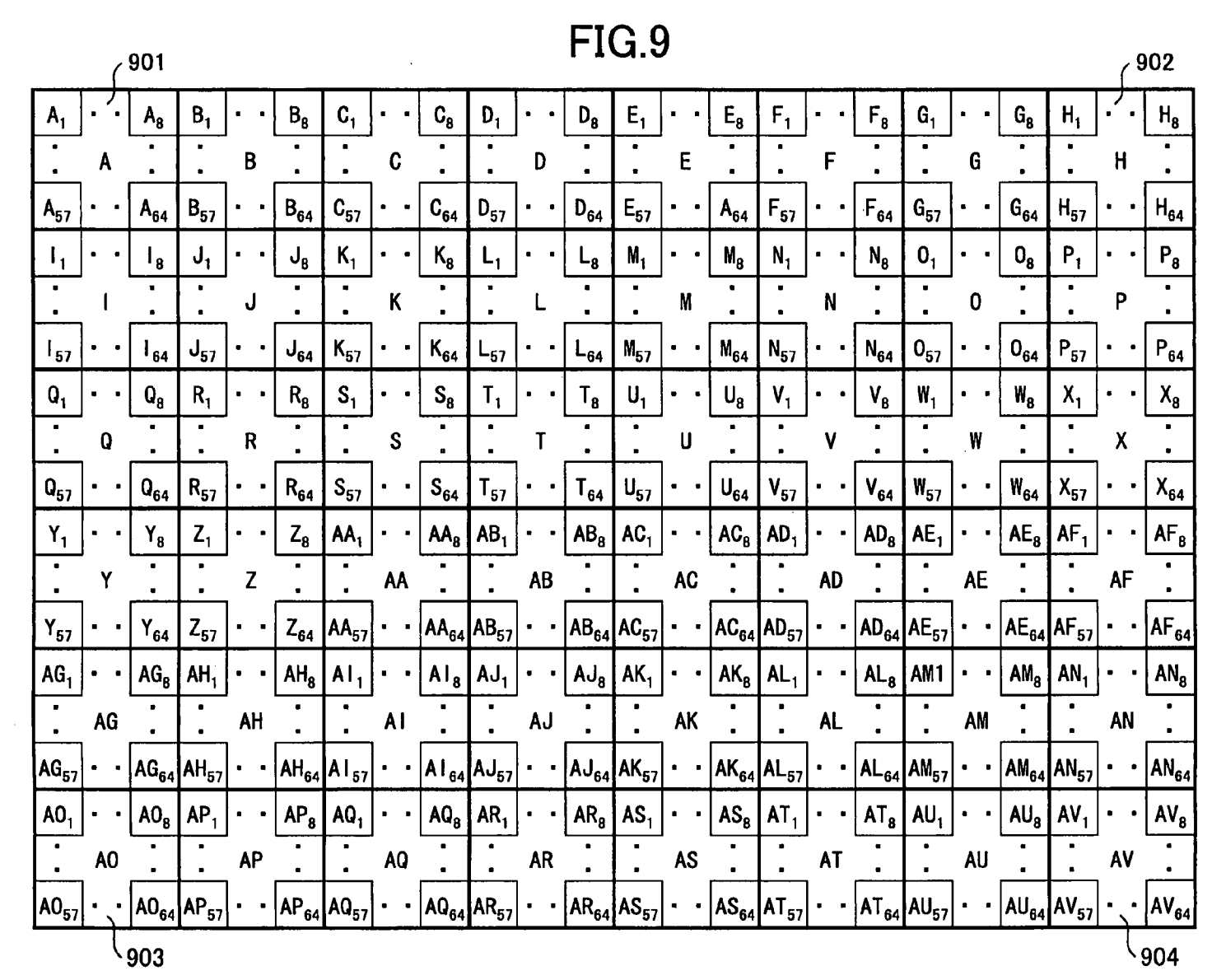

FIG. 9 is a diagram illustrating an example of original image data.

The original image data shown in FIG. 9 includes plural large blocks (A through AV) having a preset block size, and, for example, each large block includes 8×8 BTC blocks. For example, in the large block 901, there are BTC blocks A1 to A64. In addition, each of the BTC blocks includes 4×4 dots.

The printer controller 702 includes a reception memory 721, data recovery units 722-1 and 722-2, data rotation units 723-1 and 723-2, large block buffers (block storage unit) 724-1 and 724-2, data decompression units 725-1 and 725-2, image processing units 726-1 to 726-4, and line memories 727-1 to 727-4.

In the printer controller 702 shown in FIG. 7, in order to reduce the required memory capacity of the line memories 727, for example, there are two data recovery units 722-1 and 722-2, two data rotation units 723-1 and 723-2, two large block buffers 724-1 and 724-2, two data decompression units 725-1 and 725-2, and four image processing units 726-1 to 726-4.

In addition, the data recovery units 722-1 and 722-2, the data rotation units 723-1 and 723-2, the large block buffers 724-1 and 724-2, and the data decompression units 725-1 and 725-2 perform image processing on image data of at least one color out of image data of plural colors.

In the following descriptions, it is assumed that among the image data of CMYK four colors, the data recovery unit 722-1, the data rotation unit 723-1, the large block buffer 724-1, and the data decompression unit 725-1 perform image processing on image data of cyan (C) and magenta (M) colors; the data recovery unit 722-2, the data rotation unit 723-2, the large block buffer 724-2, and the data decompression unit 725-2 perform image processing on image data of yellow (Y) and black (K) colors. The effect of reducing the required memory capacity of the line memories 727 is described below.

Data omission and secondary compression are performed on image data of the large block A (901) through the large block AV (904), and the resulting image data are stored in the reception memory 721.

As described above, in the page list, which is sent from the computer 701 together with the omission secondary compression image data, there is information of "rotate by 90 degrees in the clockwise direction", and based on this information, the address information of the large blocks, specifically, from a large block AO (903) to a large block H (902) in order, are written down.

The data recovery units 722-1 and 722-2 in the printer controller 702 refer to the page list and decompress the data, which are compressed in the secondary compression, from the large block AO (903) to the large block H (902) in order. In addition, the data recovery units 722-1 and 722-2 confirm headers of the large blocks and the difference headers of the BTC data groups, and recover the data.

As described above, the difference header of BTC data groups indicates the difference between the immediately preceding BTC data group and newly input BTC data group. That is, after comparing data, the byte having the same value assumes the value of the preceding byte, and for the bytes having different values, the value added to the next byte is used to form a data sequence. Therefore, following a procedure reverse to the data omission procedure as described with reference to FIG. 8, the BTC data sequence is generated from the omitted data.

The header of the large block includes data indicating how many colors the color information corresponds to in all the BTC data in the large block. When the color information used in all the BTC data in the large block corresponds to two colors or one color, the data recovery units 722-1 and 722-2 collect the omitted color information and color selection information, and recover the data so that the data can be dealt with as BTC data of four typical colors in the later stage image processing units 726-1 to 726-4.

Since the color information may change along with the BTC data, it is necessary to adjust the data length of the recovered BTC data. In this case, for example, by inserting "zero" or preset values, it is possible to adjust the data length.

Below, this process is described in detail.

FIG. 10A and FIG. 10B are diagrams illustrating an example of recovered BTC data, where FIG. 10A shows an example of the BTC format and FIG. 10B shows an example of color selection format.

As shown by the BTC format 1001 in FIG. 10A, when recovering the omitted data, for example, color information of any colors corresponding to two colors are added, and as shown in FIG. 10B, in the BTC format, when recovering the omitted data, for example, color information of any colors corresponding to two colors are added. In addition, as shown by the color selection format 1002 in FIG. 10A, prior to bits (A1 to A8, B1 to B8), which have been stored as the color information, a bit of "0" is inserted, and thereby, it is possible to adjust the data length of the recovered BTC data. In other words, in the color selection information, by inserting "zero" between bits, BTC data of two typical colors are expanded to BTC data of four typical colors.

Figure 11:
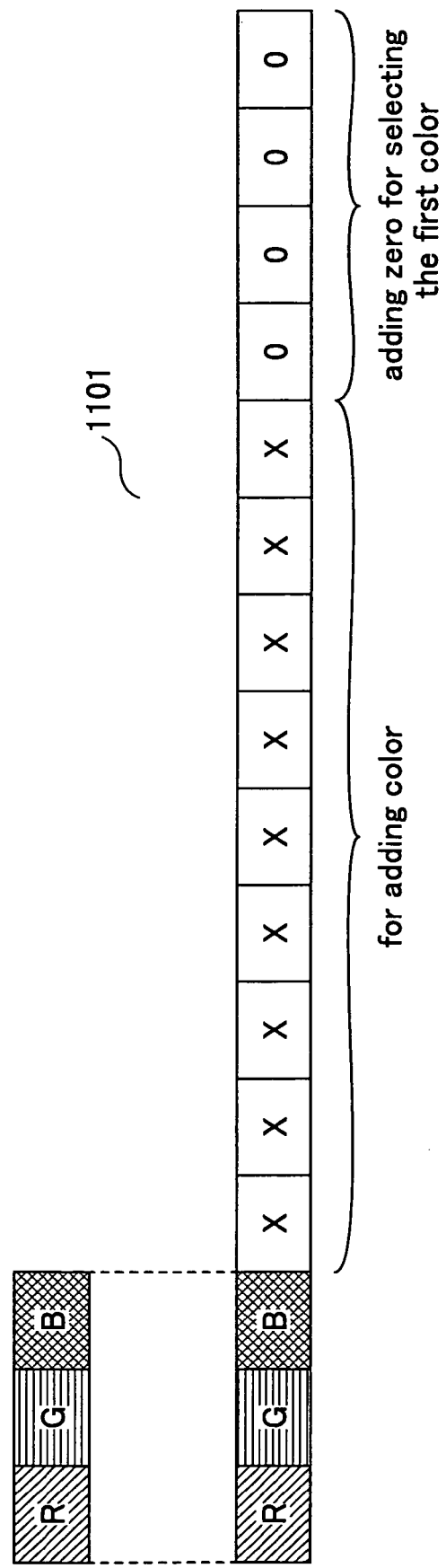
FIG. 11 is a diagram illustrating an example of a BTC format when the color information corresponds to one color.

FIG. 11 is a diagram illustrating an example of a BTC format when the color information corresponds to one color.

As shown by the BTC format 1101 in FIG. 11, color information of any colors corresponding to three colors are added, and it is sufficient to select the first color in the color selection information. Therefore, all bits may be assigned to a value of "0". In other words, in the color selection information, by inserting "zero", it is possible to adjust the data length of the recovered BTC data, and thereby, BTC data of one typical color are expanded to BTC data of four typical colors.

Next, the image rotation units 723-1 and 723-2 carry out image rotation processing on the BTC data of four typical colors, which correspond to one column of a large block recovered by the data recovery units 722-1 and 722-2, and expand the rotated compression image data in the large block buffers 724-1 and 724-2, respectively.

<Image Rotation Units 723-1 and 723-2>

Below, functions of the image rotation units 723-1 and 723-2 are described in detail.

Figure 12:
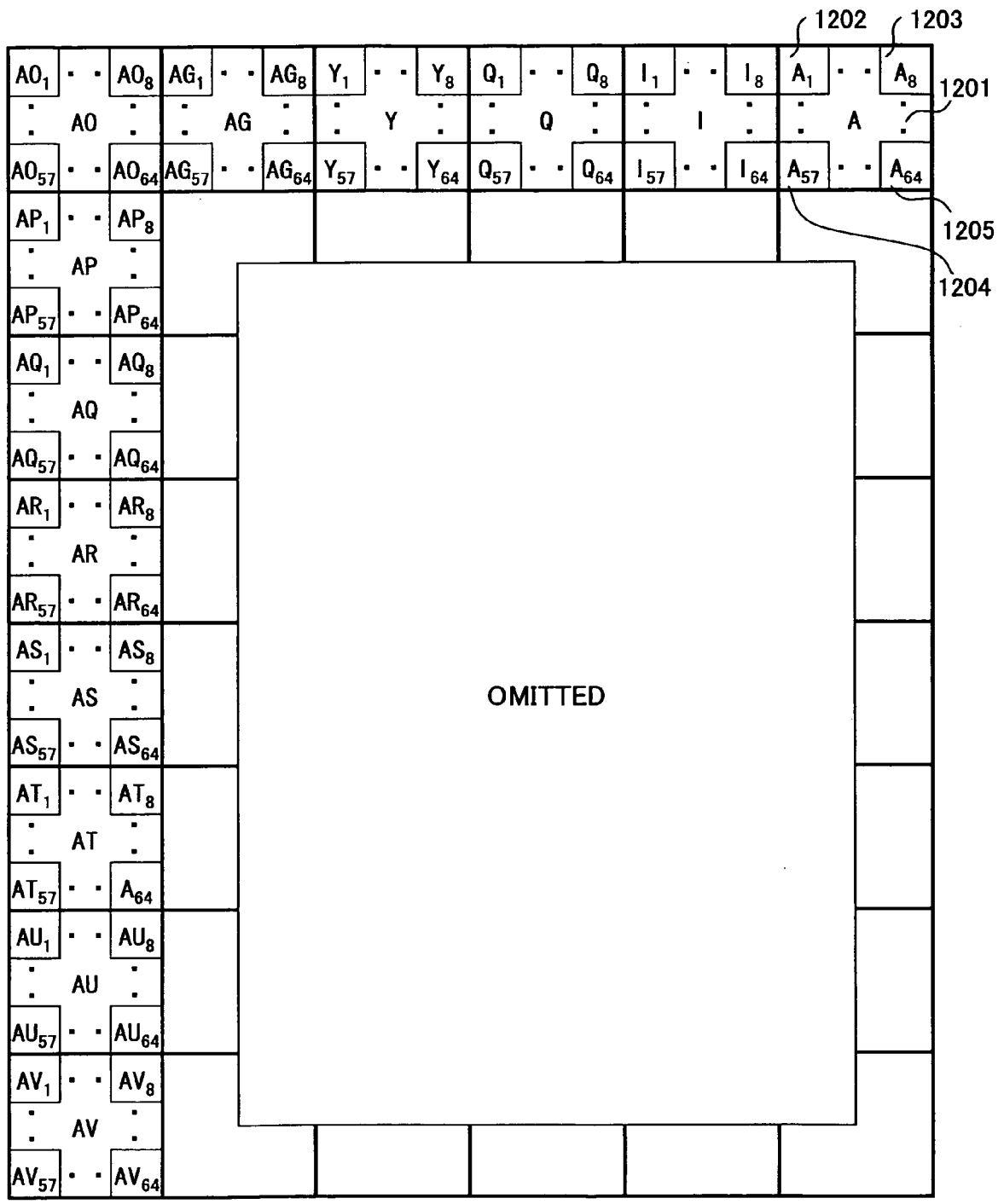
FIG. 12 is a diagram illustrating an example of a first state of the image data in the course of rotation.

FIG. 12 is a diagram illustrating an example of a first state of the image data in the course of rotation.

The image rotation units 723-1 and 723-2 rotate, in a preset direction, the image data recovered by the data recovery units 722-1 and 722-2 according to address information of the large blocks which are shown in the page list and are arranged in order of reading the large blocks. Due to this, the image data have a state as that shown in FIG. 12.

In FIG. 12, illustration of some large blocks is omitted, but these large blocks are rotated in the same way as those illustrated large blocks. In the state shown in FIG. 12, since only the large blocks are re-arranged, the rotation of the page is not completed, and it is necessary to further carry out rotation in the large blocks.

For this reason, next, the image rotation units 723-1 and 723-2 re-arrange the BTC data in the large blocks. Below, an explanation is made of the operation of re-arranging the BTC data in the large block with a large block A (1201) in FIG. 12 as an example.

Since the BTC compression involves a fixed data length, after decompression of secondary compression image data, recovery by using the difference header, and addition of the omitted color information in the data recovery units 722-1 and 722-2, the starting addresses of all BTC data in the large blocks are known. Due to this, re-arrangement of the BTC data 1202, 1203, 1204, 1205 in the large block A (1201) can be realized easily.

Figure 13:
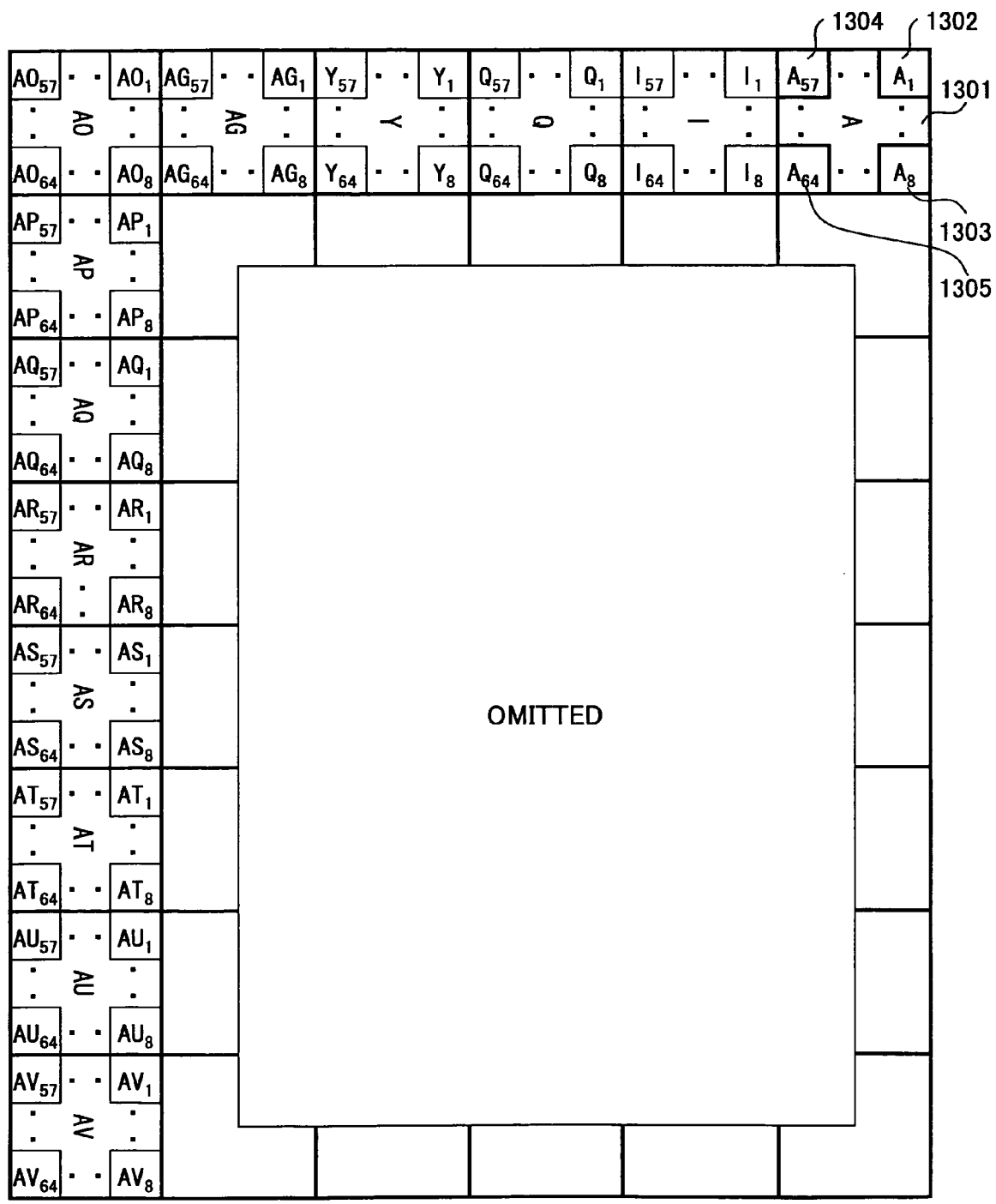
FIG. 13 is a diagram illustrating an example of a second state of the image data in the course of rotation.

FIG. 13 is a diagram illustrating an example of a second state of the image data in the course of rotation.

In FIG. 13, illustration of some large blocks is omitted, but these large blocks are rotated in the same way as those illustrated large blocks. As shown in FIG. 13, the BTC data 1202 are changed to BTC data 1302, the BTC data 1203 are changed to BTC data 1303, the BTC data 1204 are changed to BTC data 1304, and the BTC data 1205 are changed to BTC data 1305.

Figure 14:
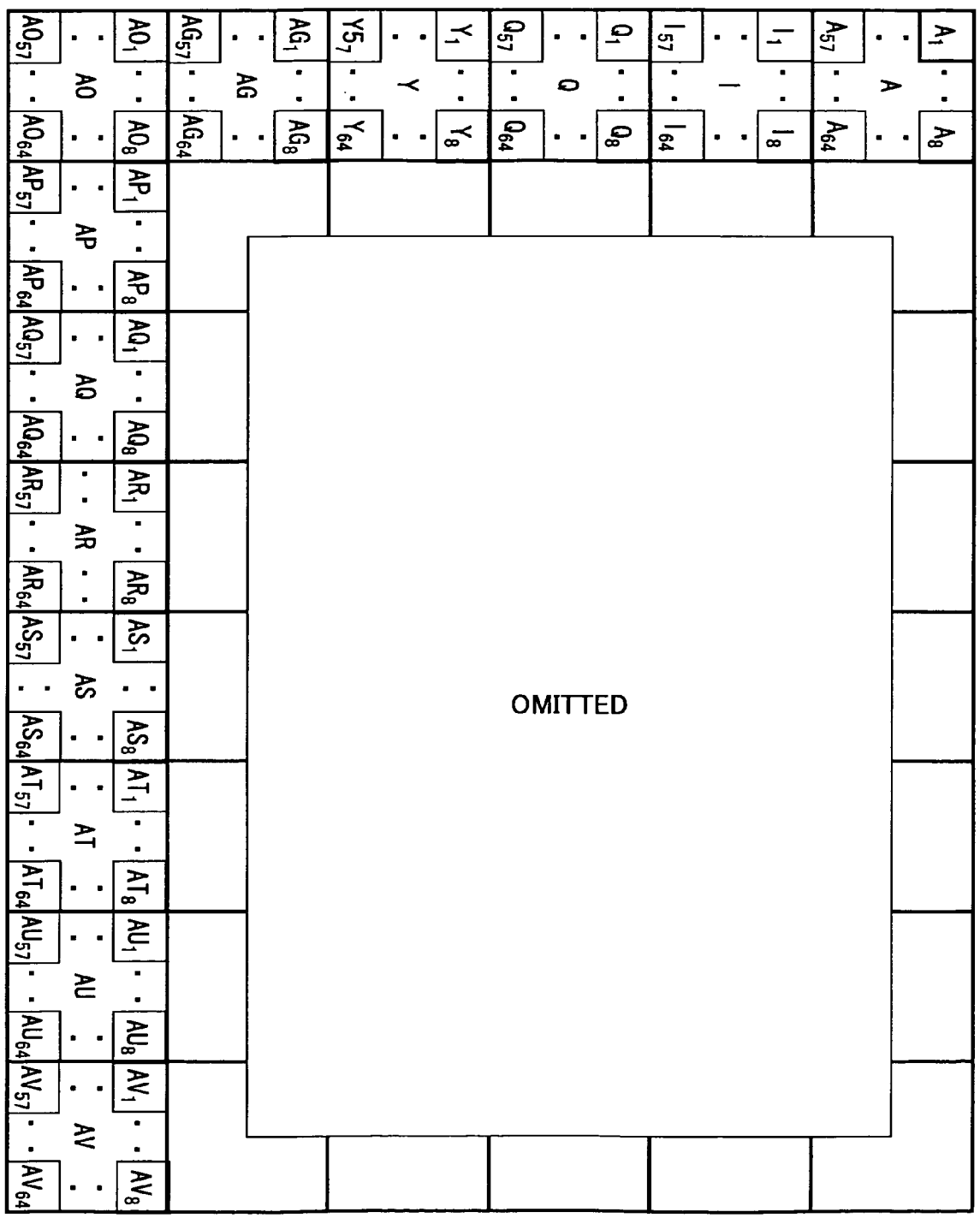
FIG. 14 is a diagram illustrating an example of a final state of the image data after the image rotation processing.

FIG. 14 is a diagram illustrating an example of a final state of the image data after the image rotation processing.

Next, the image rotation units 723-1 and 723-2 further carry out image rotation inside the BTC blocks. As described above, this can be easily realized by re-arranging color selection information in the BTC data format. The image data after the rearrangement are shown in FIG. 14. In FIG. 14, illustration of some large blocks is omitted, but these large blocks are rotated in the same way as those illustrated large blocks.

The BTC data shown in FIG. 14 are stored in the large block buffers 724-1 and 724-2, which are formed by DRAMs (Dynamic Random Access Memory). It is not necessary for the large block buffers 724-1 and 724-2 to store data corresponding to one side of a page as in the related art, but it is sufficient for the large block buffers 724-1 and 724-2 to have a capacity corresponding to two large blocks (for two colors)×width of a printing medium. This is because the image rotation processing has been completed.

Due to the above process, by a series of operations such as BTC compression, creation of large blocks, color information omission, and difference header omission, it is possible to greatly reduce the amount of data compared to the related art, and thus, greatly reduce the required memory capacity.

In addition, the BTC data stored in the large block buffers 724-1 and 724-2 are called out when necessary, and the data decompression units 725-1 and 725-2 decompress the BTC data to generate bitmap image data. Further, the image processing units 726-1 to 726-4 carry out color conversion from RGB to CMY, black generation (BG), under color removal (UCR), registration error correction, dither processing, or edge processing on the bitmap image data generated by the data decompression units 725-1 and 725-2. The ultimately obtained image data are stored in the line memories 727-1 through 727-4, and then are sent to the printer engine 703.

The printer engine 703 receives the image data and forms an image on a printing medium according to the received signal.

<Method of Saving Line Memory 727>

Below, a method of saving the line memories 727-1 through 727-4 is described.

Figure 1:
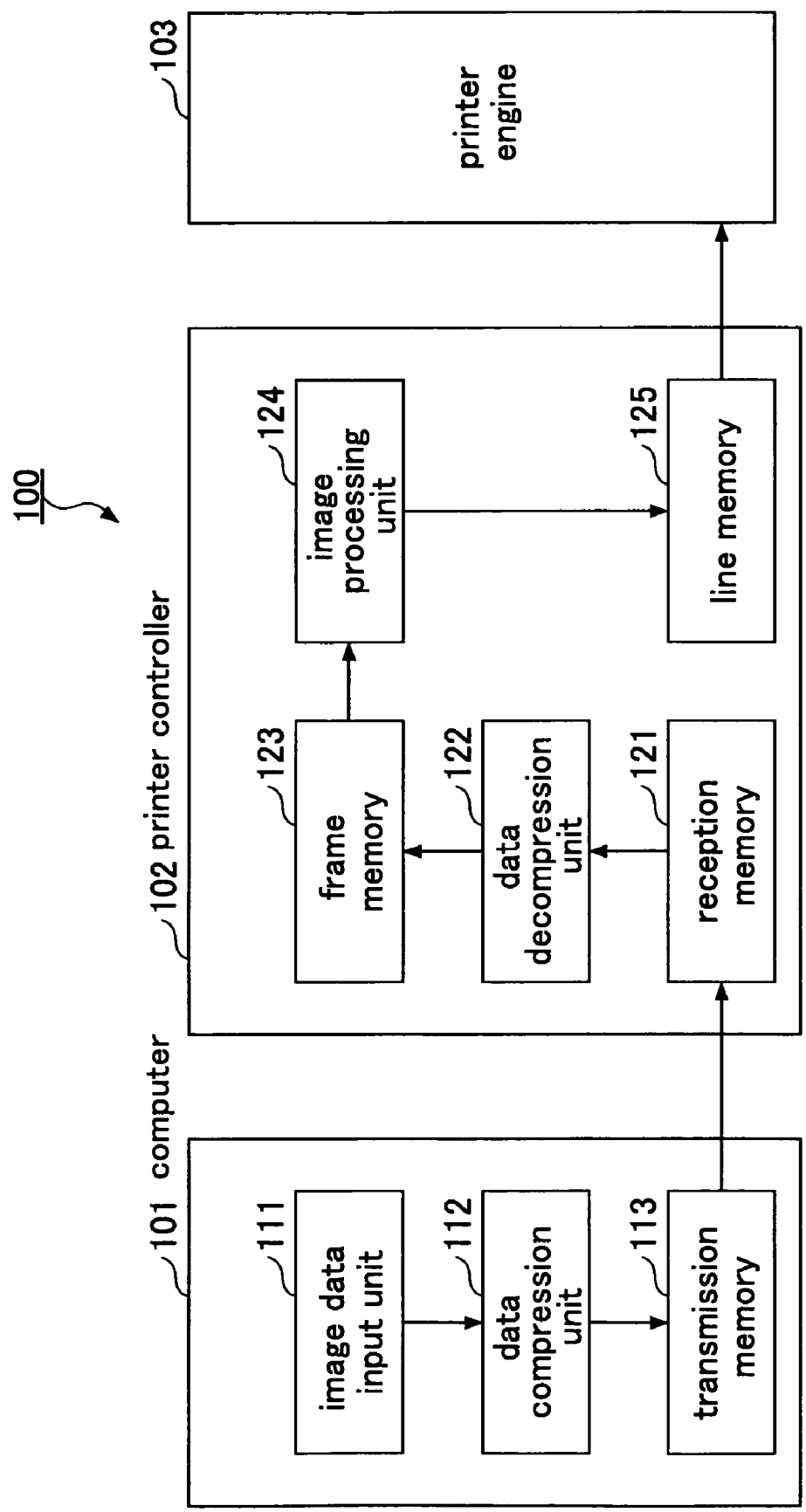
FIG. 1 is a block diagram exemplifying a configuration of an image processing apparatus in the related art.
Figure 2:
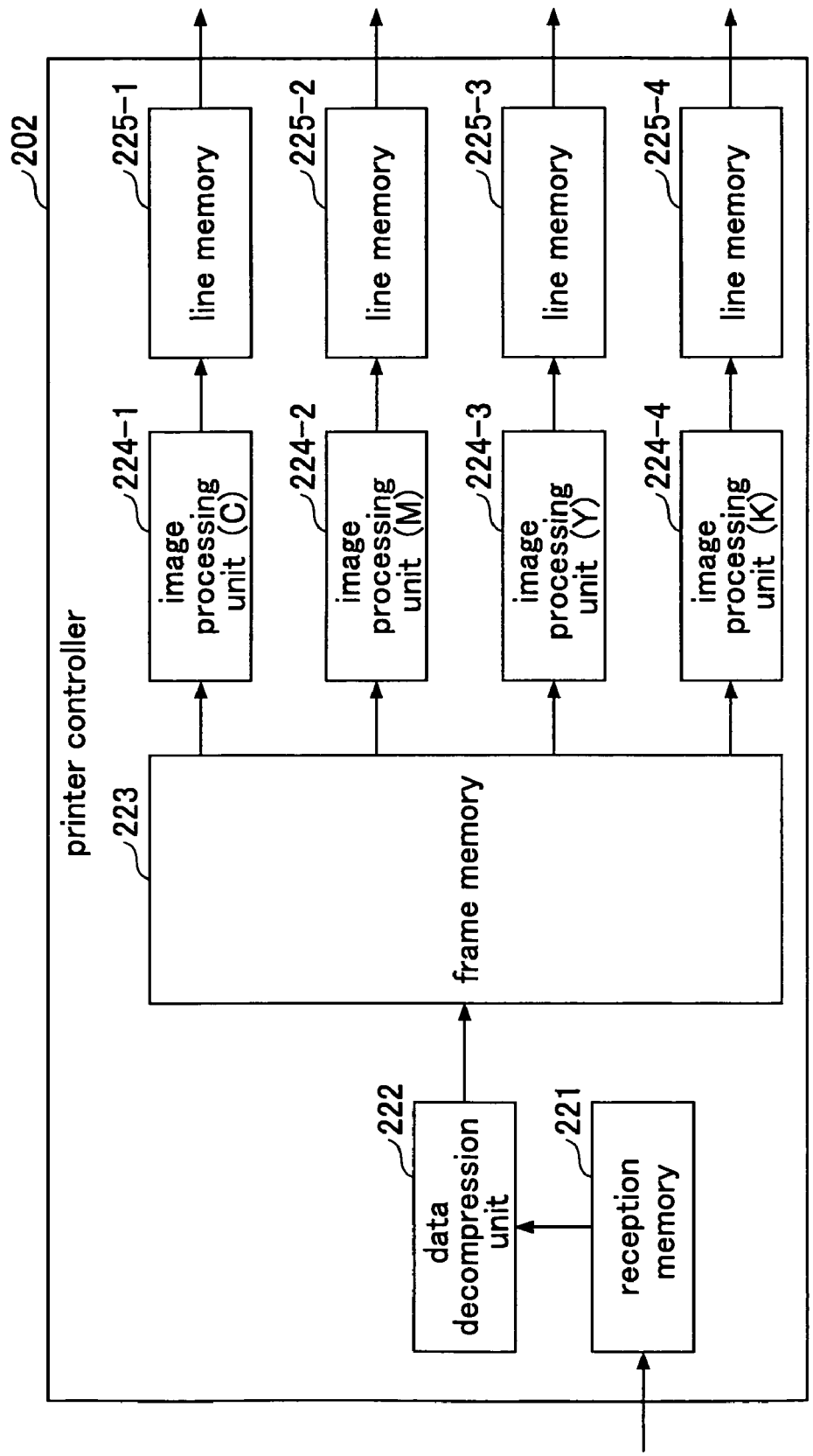
FIG. 2 is a block diagram exemplifying a configuration of a printer controller for a tandem-type operation.
Figure 3:
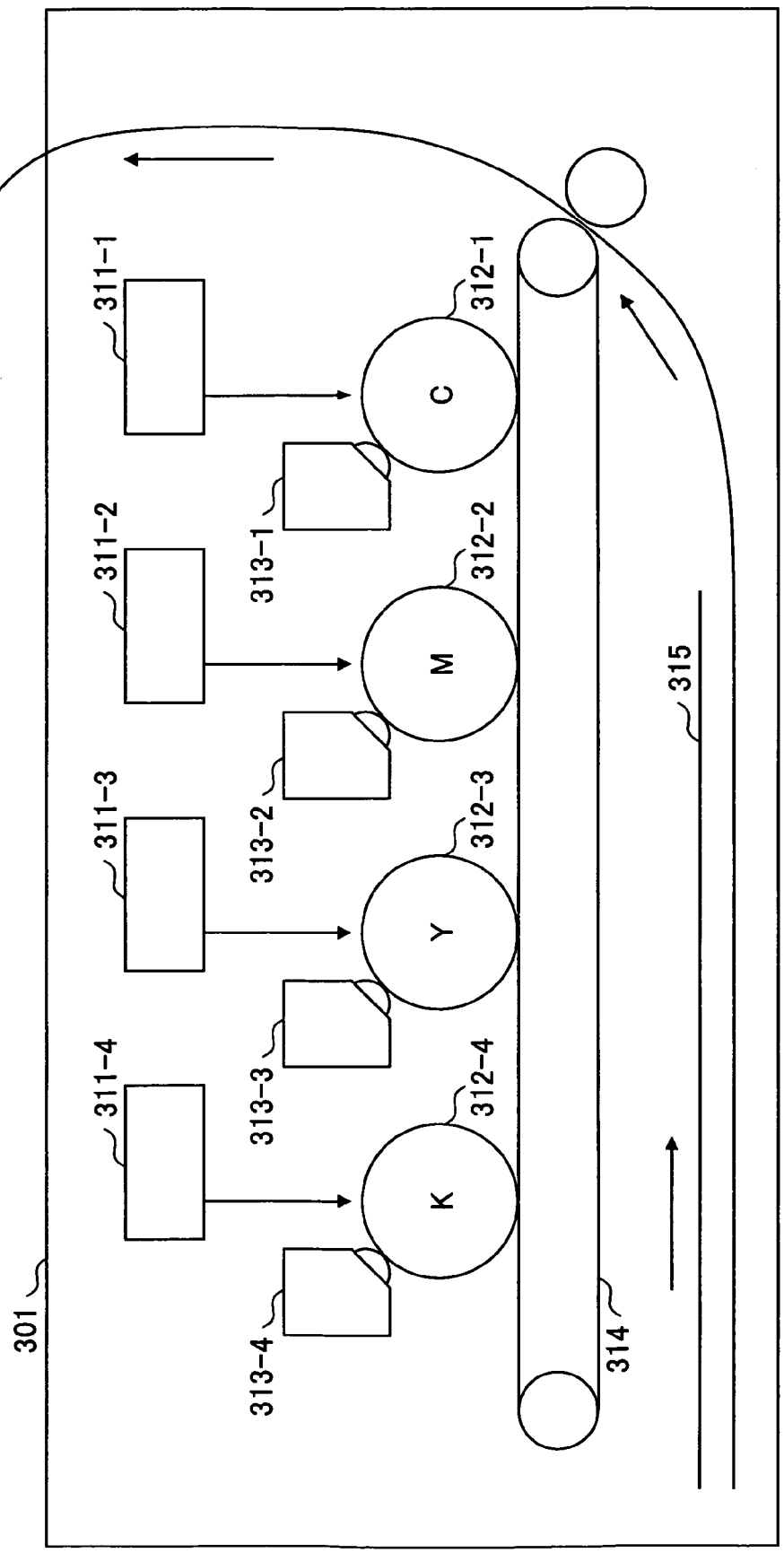
FIG. 3 is a block diagram illustrating a configuration of a tandem-type printer engine.

Generally, the BTC compression technique is characterized in that multi-level data of RGB can be obtained after decompression is performed. That is, the BTC compression technique is suitable for application to a color printer, which operates in a tandem mode and thus is able to process plural colors at the same time. However, an actual tandem-type color printer works in the way as shown in FIG. 3 as described above. That is, the exposure units 311-1 through 311-4 expose corresponding printing colors, for example, CMYK, on the photosensitive drums 312-1 through 312-4 to form electrostatic latent images thereon; the developing units 313-1 through 313-4 develop the respective latent images to form monochromatic images of the CMYK printing colors on the photosensitive drums 312-1 through 312-4, respectively; these monochromatic images are superposed on the intermediate transfer 314 and are transferred to a recoding medium 315 to form a color image thereon.

In the above process, in the printer engine shown in FIG. 3, first, cyan (C) images are formed on the intermediate transfer 314, then, magenta (M), yellow (Y), and black (K) images are formed sequentially. That is, the actual timings of processing CMYK colors are different. In the BTC compression technique, which produces printing data of different colors at the same time, it is necessary to reduce this time difference in the line memory. For this purpose, in the example shown in FIG. 3, along with shifting from cyan (C) to black (K), a line memory having a large capacity is required. For example, when the distance between the photosensitive drums of different colors is 5 cm, the image data for one dot require four bits, and the printer is for A4 documents, the capacities of the line memories of different colors are as follows, that is, 3 MB for magenta (M), 6 MB for yellow (Y), 9 MB for black (K). In other words, excessive capacity is required.

In the printer controller 702 of the present embodiment, in order to reduce the required capacities of the line memories 727-1 to 727-4, as shown in FIG. 7, there are two data recovery units 722-1 and 722-2, two data rotation units 723-1 and 723-2, two large block buffers 724-1 and 724-2, two data decompression units 725-1 and 725-2, and four image processing units 726-1 to 726-4. In addition, the data recovery units 722-1 and 722-2, the data rotation units 723-1 and 723-2, the large block buffers 724-1 and 724-2, and the data decompression units 725-1 and 725-2 perform image processing on image data of at least one color out of image data of plural colors.

For example, the data recovery unit 722-1, the data rotation unit 723-1, the large block buffer 724-1, and the data decompression unit 725-1 perform image processing on image data of cyan (C) and magenta (M) colors; the image processing unit 726-1 and the line memory 727-1 are used for cyan (C), and the image processing unit 726-2 and the line memory 727-2 are used for magenta (M).

In addition, the data recovery unit 722-2, the data rotation unit 723-2, the large block buffer 724-2, and the data decompression unit 725-2 perform image processing on image data of yellow (Y) and black (K) colors; the image processing unit 726-3 and the line memory 727-3 are used for yellow (Y), and the image processing unit 726-4 and the line memory 727-4 are used for black (K).

Due to this, it is sufficient for the line memories of magenta and black to have 3 MB in excess, and the capacity can be reduced by two-third.

According to the present embodiment, it is possible to reduce the memory capacity and realize an inexpensive printer controller.

Here, the image processing apparatus of the present embodiment may have the above hardware configuration to realize the image processing of the present invention, but the present embodiment may also be realized by executing an image processing program installed in a computer to perform the above image processing. For example, by installing the program on a common personal computer or a server, the image processing of the present embodiment can be realized very easily. In addition, by executing the program, the operations of the computer 701 and the printer controller 702 as described above can be executed.

<Hardware Configuration>

Below, descriptions are made of computer hardware configurations for the image processing of the present invention.

Figure 15:
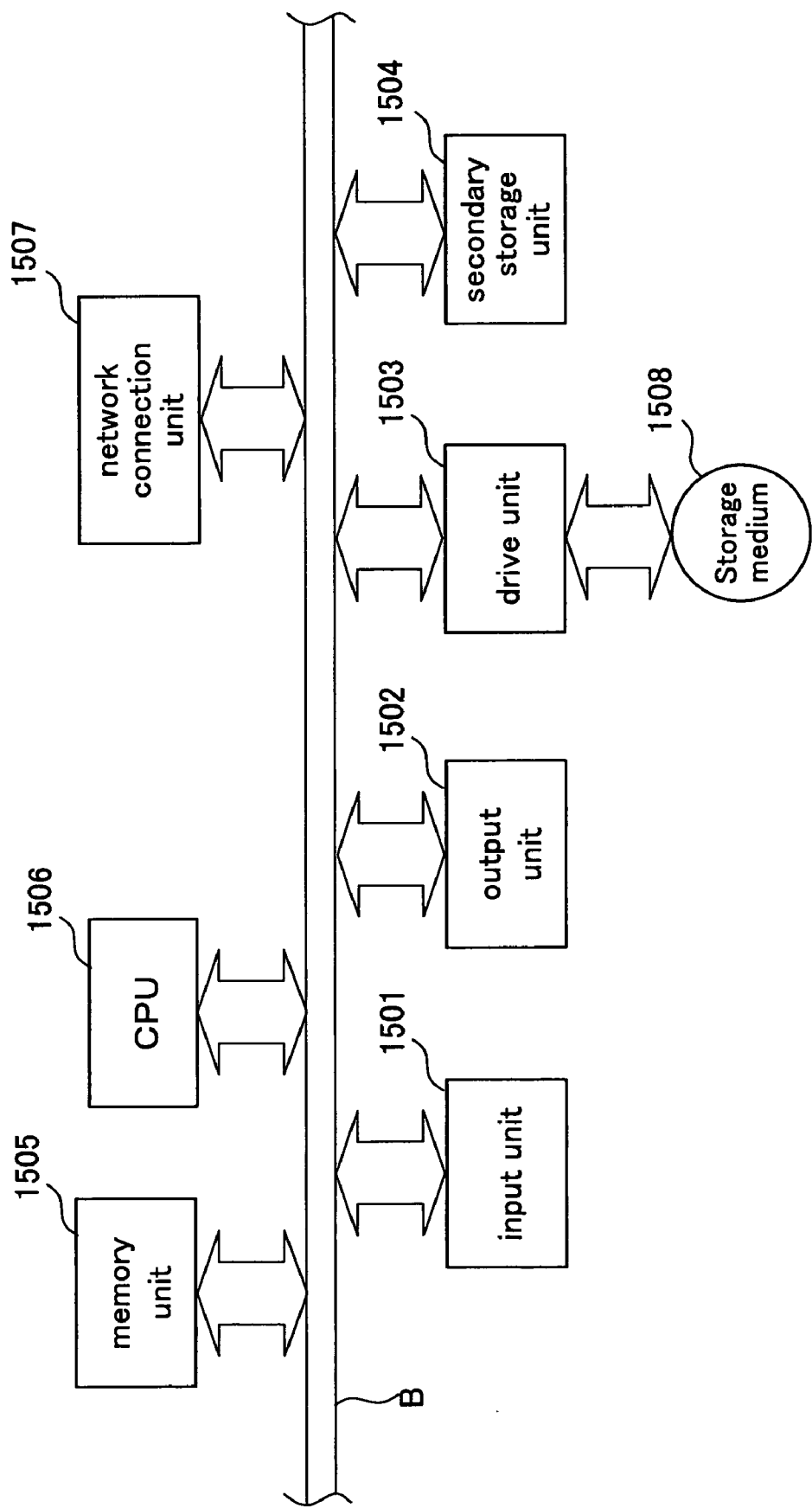
FIG. 15 is a block diagram exemplifying a hardware configuration of the image processing apparatus according to the present embodiment of the present invention.

FIG. 15 is a block diagram exemplifying a hardware configuration of the image processing apparatus according to the present embodiment of the present invention.

A computer shown in FIG. 15 includes an input unit 1501, an output unit 1502, a drive unit 1503, a secondary storage unit 1504, a memory unit 1505, a CPU (Central Processing Unit) 1506, and a network connection unit 1507.

The input unit 1501 includes a pointing device operated by a user, such as a keyboard and a mouse, for inputting various operation signals, such as instructions from the user for executing programs, or instructions from the user for inputting image data.

The output unit 1502 includes various windows used for operating the computer to execute image processing of the present invention, or a display (monitor) for displaying data, to present the process or results of execution of a control program by the CPU 1506.

In the present embodiment, for example, the image processing program to be installed in the computer is stored in a storage medium 1508, such as a CD-ROM. The storage medium 1508, in which the image processing program is stored, can be loaded in a drive device 1503, and the image processing program in the storage medium 1508 can be installed in the secondary storage unit 1504 via the drive unit 1503.

The drive unit 1503 stores programs in the storage medium 1508; due to this, by using the storage medium 1508, the image processing program of the present embodiment can be easily installed in any other computers to realize image processing of the present embodiment.

The secondary storage unit 1504 is a storage device such as a hard disk, which stores the image processing program of the present embodiment, image data used in the image processing, and control programs of the computer, and performs input or output when necessary.

The memory unit 1505 temporarily stores data when executing programs. The memory unit 1505 constitutes the above-described large block buffers and the line memories.

The CPU 1506 carries out various calculations or data input and output with hardware components of the computer based on an OS (operating system) or other control programs, and executive programs read into and temporarily stored in the memory unit 1505; and carries out overall control of the computer to realize the image processing of the present embodiment. In addition, the CPU 1506 acquires various kinds of information required when executing the programs from the secondary storage unit 1504 or stores the information in the secondary storage unit 1504.

The network connection unit 1507 is connected to a communication network; hence it is possible to acquire executive programs from other terminals connected to the communication network and transmit execution results obtained when executing executive programs, or transfer the executive programs of the present embodiment to the other terminals.

With the above hardware configuration, it is possible to realize image processing of the present embodiment by using existing devices without using any special devices, thus, at low cost. In addition, the image processing program of the present embodiment can be realized easily by just installing the image processing program of the present embodiment; thus it is possible to realize image processing with a small memory area, and reduce the memory capacity in the image processing apparatus.

<Image Processing Procedure>

Next, image processing by using the image processing program of the present embodiment is described with reference to flowcharts in FIG. 16 and FIG. 17. The image processing program includes operations in the computer 701, namely, a compression process, and operations in the printer controller 702, namely, a decompression process.

<<Compression Process>>

Figure 16:
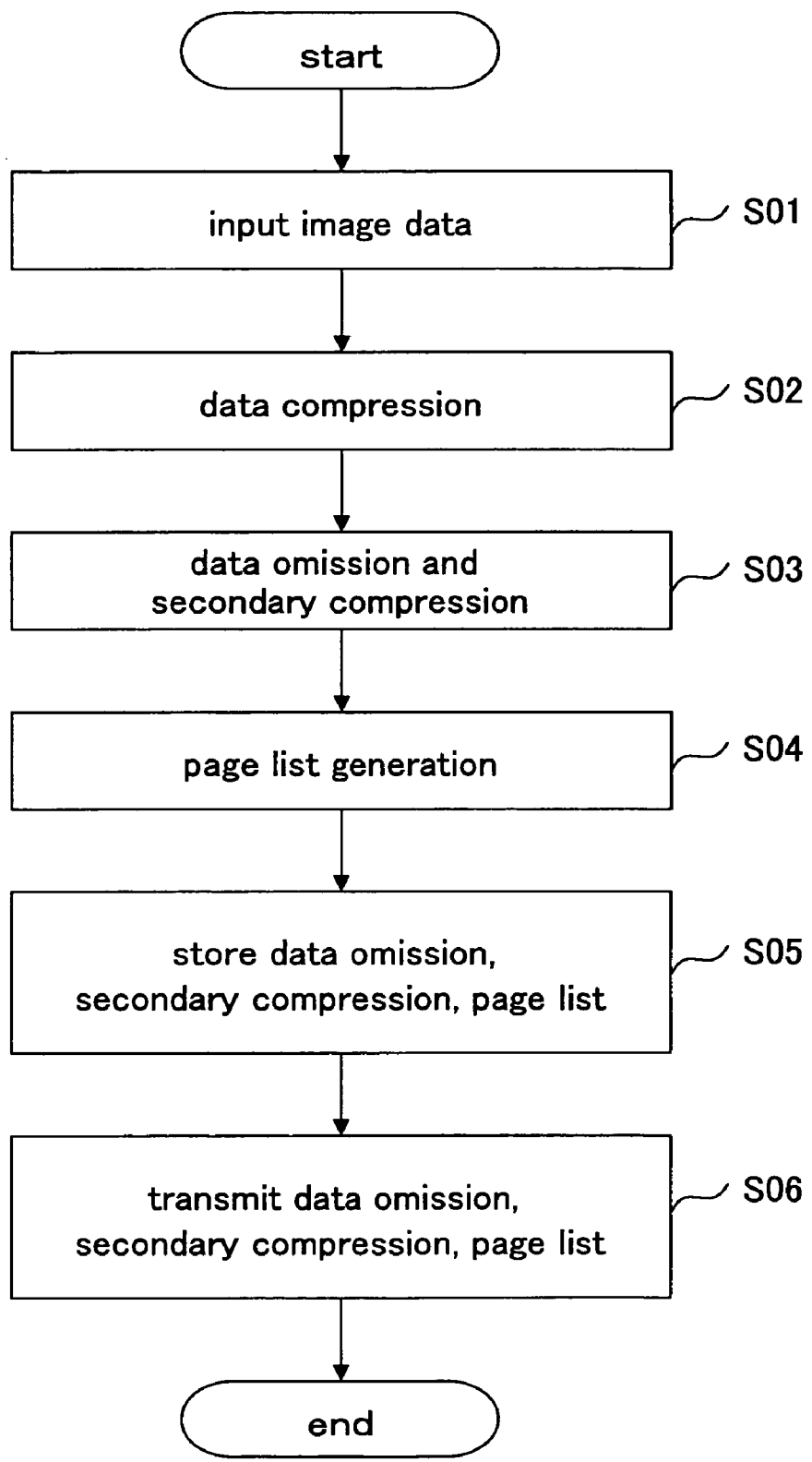
FIG. 16 is a flowchart illustrating a data compression process according to the present embodiment of the present invention.

FIG. 16 is a flowchart illustrating a data compression process according to the present embodiment of the present invention.

As shown in FIG. 16, in step S1, image data are input.

Next, in step S2, the image data are compressed. In the present embodiment, there is no limitation to the image data, for example, the image data may be bitmap image data. Further, the above-mentioned BTC compression method is used for data compression.

Next, in step S3, the data omission and the secondary compression is performed on the BTC compression image data.

Specifically, two successive BTC format data groups are compared in units of bytes, and based on the comparison results, the difference header is created. Then, only bytes indicated to be different by the difference header are maintained, and other data are omitted. In this way, the amount of data is reduced.

The secondary compression is performed by using common compression techniques, such as JBIG or MH. This further reduces the amount of data.

Next, in step S4, the page list (page information), which includes addresses of the secondary compression image data, is generated in correspondence to the secondary compression image data and in order of decompression of the large blocks while taking into consideration of the rotational direction of the data in the rotation process.

Next, in step S5, the omission secondary compression image data obtained in step S3 and the page list obtained in step S5 are stored.

Next, in step S6, a preset amount of the omission secondary compression image data and the page list are transmitted to the printer controller 702 at preset timings.

<<Decompression Process>>

Figure 17:
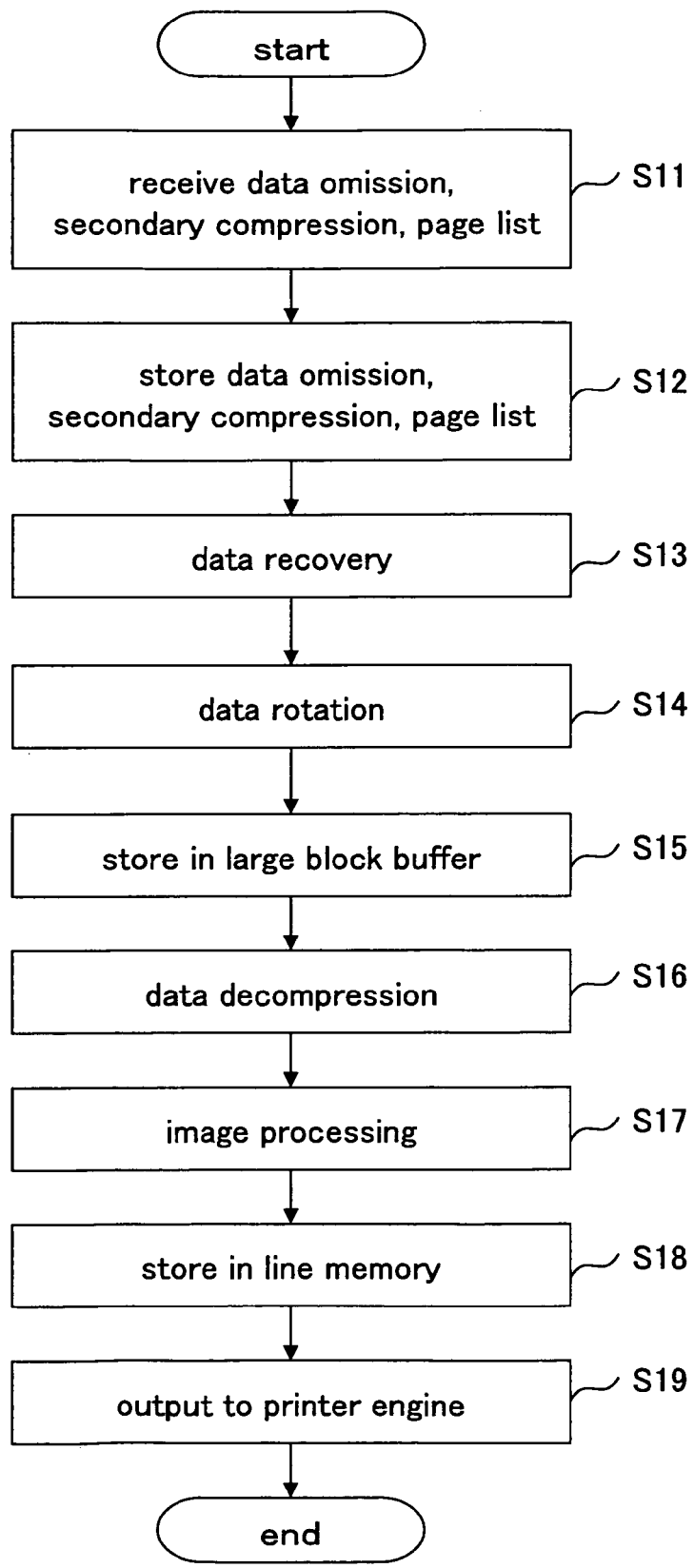
FIG. 17 is a flowchart illustrating a data decompression processing according to the present embodiment of the present invention.

FIG. 17 is a flowchart illustrating a data decompression processing according to the present embodiment of the present invention.

As shown in FIG. 17, in step S11, the omission secondary compression image data and the page list transmitted in step S6 are received.

Next, in step S12, the received omission secondary compression image data and the page list are stored in the memory.

Next, in step S13, the omission secondary compression image data stored in the memory in step S12 are read out for image data recovery. Specifically, with reference to the page list, the secondary compression image data are decompressed; in addition, the omitted data are recovered by confirming headers of the large blocks and the difference headers of the BTC data. Namely, following a procedure reverse to the data omission procedure as described with reference to FIG. 8, the BTC data sequence is generated from the omitted data.

The header of one large block includes data indicating how many colors the color information corresponds to in all the BTC data in the large block. When the color information used in all the BTC data in the large block corresponds to two colors or one color, the omitted color information and color selection information are collected and added, and the data are recovered so that the data can be dealt with as BTC data of four typical colors in the later stage image processing.

Next, in step S14, with reference to the page list, the compression image data are rotated.

Next, in step S15, the rotated compression image data are stored in the large block buffers.

Since the image data are compressed by BTC compression, and the compression image data are further rotated, the amount of data is greatly reduced, and the required capacity of the large block buffers is small.

Next, in step S16, compression image data stored in the large block buffers are decompressed, and bitmap image data are generated.

Next, in step S17, color conversion from RGB to CMY, black generation (BG), under color removal (UCR), registration error correction, dither processing, or edge processing on the bitmap image data are carried out.

Next, in step S18, the ultimately obtained image data are stored in the line memories.

Next, in step S19, the image data stored in the line memories are sent to the printer engine serving as an image output unit.

As described above, by executing an image processing program, image processing can be realized using a small memory area, and it is possible to reduce hardware resources and the memory capacity in the image processing apparatus compared to the related art, thereby realizing an inexpensive printer controller. In addition, by installing the image processing program, it is possible to realize image processing easily.

In addition, in the embodiment of the present invention, since data omission is performed based on similarity of two compression image data groups, it is possible to reduce the amount of image data to be transmitted with high precision, and reduce the required memory capacity. In addition, since the image data can be rotated with hardware without decompression, it is possible to reduce the memory capacity. In addition, since printing data of plural colors can be generated from the compression image data at the same time, it is possible to reduce the circuitry scale.

The present invention is applicable to an image processing device able to decompress compression image data and output the decompressed image data to an image output device, for example, a controller for controlling a color printer. Certainly, the present invention is also applicable to other controllers for processing images or video.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Application No. 2005-227106 filed on Aug. 4, 2005, the entire contents of which are hereby incorporated by reference.

What is claimed is:

1. An image processing apparatus for compressing and decompressing image data, comprising:
   a compression unit configured to compress the image data to a predetermined compression format;
   an omission secondary compression unit configured to omit a portion of the compressed image data given by the compression unit, divide the compressed image data into blocks having predetermined block sizes, and perform secondary compression to generate omission secondary compression image data;
   a data recovery unit configured to recover the omission secondary compression image data into the compressed image data;
   an image rotation unit configured to rotate the compressed image data given by the data decompression unit according to the block sizes;
   a block storage unit configured to store the rotated compressed image data in units of the block sizes; and
   a data decompression unit configured to decompress the compressed image data stored in the block storage unit according to predetermined conditions.

2. An image processing apparatus, comprising:
   an upper level device that includes a compression unit configured to compress image data to a predetermined compression format, and an omission secondary compression unit configured to omit a portion of the compressed image data given by the compression unit, divide the compressed image data into blocks having predetermined block sizes, and perform secondary compression to generate omission secondary compression image data; and
   a control device that includes a data recovery unit configured to recover the omission secondary compression image data into the compressed image data, an image rotation unit configured to rotate the compressed image data decompressed by the data decompression unit according to the block sizes, a block storage unit configured to store the rotated compressed image data in units of the block sizes, and a data decompression unit configured to decompress the compressed image data stored in the block storage unit according to predetermined conditions.

3. The image processing apparatus as claimed in claim 1, wherein the omission secondary compression unit compares two successive compressed image data groups given by the compression unit, and omits the portion of the compressed image data according to comparison results.

4. The image processing apparatus as claimed in claim 1, wherein the omission secondary compression unit generates page information including address information of the omission secondary compression image data based on a predetermined rotational direction of the image rotation unit and an order of data decompression in the data decompression unit.

5. The image processing apparatus as claimed in claim 1, wherein the data recovery unit inserts predetermined values into color information and color selection information in the compressed image data, said color information and color selection information being omitted by the omission secondary compression unit.

6. The image processing apparatus as claimed in claim 1, comprising plural of the data decompression units or plural of the image rotation units when the image data includes a plurality of colors.

7. An image processing method for compressing and decompressing an image data, comprising the steps of:
   compressing the image data to a predetermined compression format;
   omitting a portion of the compressed image data obtained in the step of compressing, dividing the compressed image data into blocks having predetermined block sizes, and performing secondary compression to generate omission secondary compression image data;
   recovering the omission secondary compression image data into the compressed image data; rotating the compressed image data produced in the step of recovering according to the block sizes;
   storing the rotated compressed image data in units of the block sizes; and
   decompressing the compressed image data stored in the step of storing according to predetermined conditions.

8. The image processing method as claimed in claim 7, wherein the step of omitting includes a step of comparing two successive compressed image data groups obtained in the step of compressing, and omitting the portion of the compressed image data according to comparison results.

9. The image processing method as claimed in claim 7, wherein the step of omitting includes a step of generating page information including address information of the omission secondary compression image data based on a predetermined rotational direction in the step of rotating and an order of data decompression in the step of decompressing.

10. The image processing method as claimed in claim 7, wherein the step of recovering includes a step of inserting predetermined values into color information and color selection information in the compressed image data, said color information and color selection information being omitted in the step of omitting.

11. An image processing program embodied on a computer-readable storage medium and executable in a computer to drive the computer to execute the steps of:
   compressing the image data to a predetermined compression format; omitting a portion of the compressed image data obtained in the step of compressing, dividing the compressed image data into blocks having predetermined block sizes, and performing secondary compression to generate omission secondary compression image data;
   recovering the omission secondary compression image data into the compressed image data;
   rotating the compressed image data produced in the step of recovering according to the block sizes;
   storing the rotated compressed image data in units of the block sizes; and decompressing the compressed image data stored in the step of storing according to predetermined conditions.

12. The image processing program as claimed in claim 11, wherein the step of omitting includes a step of comparing two successive compressed image data groups obtained in the step of compressing, and omitting the portion of the compressed image data according to comparison results.

13. The image processing program as claimed in claim 11, wherein the step of omitting includes a step of generating page information including address information of the omission secondary compression image data based on a predetermined rotational direction in the step of rotating and an order of data decompression in the step of decompressing.

14. The image processing program as claimed in claim 11, wherein the step of recovering includes a step of inserting predetermined values into color information and color selection information in the compressed image data, said color information and color selection information being omitted in the step of omitting.

15. A computer-readable storage medium wherein an image processing program is stored, said image processing program being executable in a computer to drive the computer to execute the steps of:

compressing the image data to a predetermined compression format;

omitting a portion of the compressed image data obtained in the step of compressing, dividing the compressed image data into blocks having predetermined block sizes, and performing secondary compression to generate omission secondary compression image data;

recovering the omission secondary compression image data into the compressed image data, rotating the compressed image data produced in the step of recovering according to the block sizes;

storing the rotated compressed image data in units of the block sizes; and decompressing the compressed image data stored in the step of storing according to predetermined conditions.

16. The computer readable storage medium as claimed in claim 15, wherein the step of omitting includes a step of comparing two successive compressed image data groups obtained in the step of compressing, and omitting the portion of the compressed image data according to comparison results.

17. The computer readable storage medium as claimed in claim 15, wherein the step of omitting includes a step of generating page information including address information of the omission secondary compression image data based on a predetermined rotational direction in the step of rotating and an order of data decompression in the step of decompressing.

18. The computer readable storage medium as claimed in claim 15, wherein the step of recovering includes a step of inserting predetermined values into color information and color selection information in the compressed image data, said color information and color selection information being omitted in the step of omitting.

* * * * *